US011902065B2

United States Patent
Zuo et al.

(10) Patent No.: US 11,902,065 B2
(45) Date of Patent: *Feb. 13, 2024

(54) SHORT TRAINING SEQUENCE DESIGN METHOD AND APPARATUS

(71) Applicant: Huawei Technologies Co., Ltd., Shenzhen (CN)

(72) Inventors: Xin Zuo, Shenzhen (CN); Ming Gan, Shenzhen (CN); Dandan Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,285

(22) Filed: Feb. 23, 2023

(65) Prior Publication Data
US 2023/0283506 A1  Sep. 7, 2023

Related U.S. Application Data

(63) Continuation of application No. 17/644,392, filed on Dec. 15, 2021, now Pat. No. 11,641,298, which is a (Continued)

(30) Foreign Application Priority Data

Jul. 27, 2018 (CN) .......................... 201810846832.3

(51) Int. Cl.
H04L 27/26 (2006.01)
(52) U.S. Cl.
CPC ...... H04L 27/2602 (2013.01); H04L 27/2692 (2013.01); H04L 27/2695 (2013.01)
(58) Field of Classification Search
CPC ............ H04L 27/2602; H04L 27/2603; H04L 27/2692; H04L 27/2695; H04L 27/12613; H04W 72/0453; H04W 80/02
See application file for complete search history.

(56) References Cited

U.S. PATENT DOCUMENTS 11,206,164 B2 * 12/2021 Zuo ................. H04L 27/26132
2011/0013583 A1  1/2011 Yang et al.
(Continued)

FOREIGN PATENT DOCUMENTS

CN       101527664 A    9/2009
CN       102143574 A    8/2011
(Continued)

OTHER PUBLICATIONS

IEEE P802.11ax/D3.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, Jun. 2018, 682 pages.
(Continued)

*Primary Examiner* — Khanh C Tran
(74) *Attorney, Agent, or Firm* — Slater Matsil, LLP

(57) ABSTRACT

The application provides a short training sequence design method and apparatus. The method includes: determining a short training sequence, where the short training sequence may be obtained based on an existing sequence, and the short training sequence with comparatively good performance may be obtained through simulation calculation, for example, by adjusting a parameter; and sending a short training field on a target channel, where the short training field is obtained by performing inverse fast Fourier transformation IFFT on the short training sequence, and a bandwidth of the target channel is greater than 160 MHz.

18 Claims, 4 Drawing Sheets

Related U.S. Application Data continuation of application No. 17/158,758, filed on Jan. 26, 2021, now Pat. No. 11,206,164, which is a continuation of application No. PCT/CN2019/096291, filed on Jul. 17, 2019.

(56) References Cited

U.S. PATENT DOCUMENTS

| | | | |
|---|---|---|---|
| 2013/0114757 A1 | 5/2013 | Park et al. | |
| 2014/0070998 A1* | 3/2014 | Lee | G01S 5/10 342/464 |
| 2017/0279581 A1 | 9/2017 | Park et al. | |
| 2018/0145811 A1 | 5/2018 | Park et al. | |
| 2018/0183905 A1* | 6/2018 | Azizi | H04L 27/02 |
| 2018/0205587 A1 | 7/2018 | Xiang et al. | |
| 2019/0268739 A1* | 8/2019 | Cariou | H04L 27/2603 |
| 2019/0288895 A1 | 9/2019 | Chen et al. | |
| 2019/0289612 A1* | 9/2019 | Chen | H04L 27/2613 |
| 2020/0076552 A1* | 3/2020 | Cherian | H04L 5/0007 |
| 2020/0275371 A1 | 8/2020 | Park et al. | |
| 2022/0140962 A1 | 5/2022 | Park et al. | |

FOREIGN PATENT DOCUMENTS

| | | | |
|---|---|---|---|
| CN | 105120520 | A | 12/2015 |
| CN | 105162745 | A | 12/2015 |
| CN | 106100791 | A | 11/2016 |
| CN | 106936749 | A | 7/2017 |
| CN | 107508780 | A | 12/2017 |
| CN | 108040028 | A | 5/2018 |
| CN | 105519065 | B | 5/2019 |
| CN | 110324268 | A | 10/2019 |
| CN | 105830380 | B | 2/2020 |
| EP | 3829124 | A1 | 6/2021 |
| KR | 20130010487 | A | 1/2013 |
| KR | 20140088130 | A | 7/2014 |
| KR | 20150090189 | A | 8/2015 |
| KR | 20180034647 | A | 4/2018 |
| TW | 201129034 | A | 8/2011 |
| WO | 2013152111 | A1 | 10/2013 |
| WO | 2015081132 | A1 | 6/2015 |
| WO | 2015165025 | A1 | 11/2015 |
| WO | 2019178511 | A1 | 9/2019 |

OTHER PUBLICATIONS

Noh, Y. et al., "Gamma phase rotation HE PPDU", IEEE 802.11-16/0903r1, IEEE-SA Mentor, Piscataway, NJ, US, Jul. 25, 2016, 26 pages.

Park, E. et al., "HE-STF Sequences", IEEE 802.11-15/1323r1, Nov. 11, 2015, 28 pages.

Park, E. et al., "HE-STF Sequences for 160/80+80MHz", IEEE 802.11-16/0335r0, Mar. 14, 2016, 21 pages.

Park, E. et al., "Overview of PHY Features for EHT", IEEE 802.11-18/1967r1, IEEE-SA Mentor, Piscataway, NJ, US, Jan. 14, 2019, 22 pages.

Park, E. et al., "Consideration on EHT-STF", IEEE 802.11-20/0585r0, Apr. 16, 2020, 16 pages.

Porat, R. et al., "HE-STF Sequences", IEEE 802.11-5/1323r0, XP068099280, Nov. 2015, 28 Pages.

Park, E. et al., "HE-STF Sequences", IEEE 802.11-15/1323r0, Nov. 9, 2015, 28 pages.

IEEE P802.11n/D2.00, Draft Standard for Information Technology—Telecommunications and information exchange between systems—Local and metropolitan area networks—Specific requirements—Part 11: Wireless LAN Medium Access Control (MAC) and Physical Layer (PHY) specifications:Amendment number>: Enhancements for Higher Throughput, Feb. 2007, 498 pages.

\* cited by examiner (1)

(2)

SHORT TRAINING SEQUENCE DESIGN METHOD AND APPARATUS

CROSS-REFERENCE TO RELATED APPLICATIONS

This application is a continuation of U.S. patent application Ser. No. 17/644,392, filed on Dec. 15, 2021, which is a continuation of U.S. patent application Ser. No. 17/158,758, filed on Jan. 26, 2021, now U.S. Pat. No. 11,206,164, which is a continuation of International Application No. PCT/CN2019/096291, filed on Jul. 17, 2019. The International Application claims priority to Chinese Patent Application No. 201810846832.3, filed on Jul. 27, 2018. All of the afore-mentioned patent applications are hereby incorporated by reference in their entireties.

TECHNICAL FIELD

This application relates to the communications field, and more specifically, to a short training sequence design method and apparatus.

BACKGROUND

During evolution from 802.11a to 802.11g, 802.11n, 802.11ac, and 802.11ax, available frequency bands include 2.4 gigahertz (GHz) and 5 GHz. As a quantity of open frequency bands increases, a maximum channel bandwidth supported by 802.11 is extended from 20 megahertz (MHz) to 40 MHz and then to 160 MHz. In 2017, the US Federal Communications Commission (FCC) opened a new free 6-GHz frequency band (5925-7125 MHz), and workers of the 802.11ax standard extended an operating range of 802.11ax devices from 2.4 GHz and 5 GHz to 2.4 GHz, 5 GHz, and 6 GHz in the 802.11ax project authorization requests (PAR). Because an available bandwidth of the newly opened 6-GHz frequency band is higher, it can be predicted that a channel bandwidth greater than 160 MHz is to be supported in evolution of a next-generation standard after 802.11ax.

In this case, how to design a short training field (STF) is a concern for a higher channel bandwidth.

SUMMARY

This application provides a short training sequence design method and apparatus, so that a short training sequence can be designed for a higher channel bandwidth, and backward compatibility can be implemented.

According to a first aspect, a short training field sending method is provided. The method includes: determining a short training sequence; and sending a short training field on a target channel, where the short training field is obtained by performing inverse fast Fourier transformation IFFT on the short training sequence, and a bandwidth of the target channel is greater than 160 MHz.

Based on the foregoing technical solution, a short training sequence corresponding to a higher channel bandwidth is determined, so that a receive end can perform automatic gain control on data transmitted on the higher channel bandwidth. The short training sequence may be obtained based on a short training sequence for an existing channel bandwidth, and a short training sequence with comparatively good performance may be obtained through simulation calculation, for example, by adjusting a parameter. Then inverse fast Fourier transformation is performed on the short training sequence to obtain a short training field. According to this embodiment of this application, a higher channel bandwidth can be achieved in practice, and backward compatibility is implemented. In addition, exhaustive simulation is performed on parameters to verify that the short training sequence provided in this embodiment of this application has a comparatively small peak-to-average power ratio PAPR and comparatively good performance, thereby improving an estimation effect for an automatic gain control circuit at a receive end, and reducing a receive bit error rate.

With reference to the first aspect, in some implementations of the first aspect, the short training sequence is obtained through transformation based on an M-sequence, or the short training sequence is obtained through transformation based on a high efficiency frequency-domain sequence HES corresponding to a bandwidth of a reference channel, where the bandwidth of the reference channel is less than or equal to 160 MHz.

Based on the foregoing technical solution, the short training sequence corresponding to the higher channel bandwidth may be directly obtained based on the M-sequence. For example, it can be learned from the 802.11ax standard that a high efficiency-short training sequence HE-STF is constructed by performing multiplexing, phase rotation, and combination based on the M-sequence. The M-sequence is defined as M={−1, −1, −1, 1, 1, 1, −1, 1, 1, 1, −1, 1, 1, −1, 1} in the 802.11ax standard. Alternatively, the short training sequence corresponding to the higher channel bandwidth may be obtained based on a high efficiency frequency-domain sequence HES corresponding to an existing channel, for example, an HES corresponding to 80 MHz or 160 MHz, so as to be compatible with an existing short training sequence. For the HES, the 802.11ax standard defines a frequency-domain value $HES_{a:b:c}$ of the HE-STF, where a indicates a subscript of a starting tone, c indicates a subscript of an ending tone, b indicates a spacing, and a:b:c indicates starting with a tone a and ending with a tone c, with a spacing of b tones in between. On other tones, an HES value is 0.

With reference to the first aspect, in some implementations of the first aspect, the bandwidth of the target channel is 240 MHz; and when a periodicity included in the short training field is 0.8 μs, the short training sequence is expressed as follows:

{L1, 1, −R1, 1, −L1, 0, R1, 0, −L1, 0, −R1}·(1+j)/$\sqrt{2}$; or
{−L1, −1, R1, −1, L1, 0, −R1, 0, L1, 0, R1}·(1+j)/$\sqrt{2}$; or
{L1, 1, −R1, −1, −L1, 0, −R1, 1, L1, 1, R1}·(1+j)/$\sqrt{2}$; or
{−L1, −1, R1, 1, L1, 0, R1, −1, −L1, −1, −R1}·(1+j)/$\sqrt{2}$; or {L1, 1, −R1, 1, −L1, 0, R1, 1, −L1, 0, −R1}·(1+j)/$\sqrt{2}$; or
{−L1, −1, R1, −1, L1, 0, −R1, −1, L1, 0, R1}·(1+j)/$\sqrt{2}$; or
{L1, 0, −R1, 0, −L1, 0, R1, −1, −L1, 0, −R1}·(1+j)/$\sqrt{2}$; or
{−L1, 0, R1, 0, L1, 0, −R1, 1, L1, 0, R1}·(1+j)/$\sqrt{2}$; or
{L1, 1, −R1, 0, −L1, 0, R1, −1, −L1, 0, −R1}·(1+j)/$\sqrt{2}$; or
{−L1, −1, R1, 0, L1, 0, −R1, 1, L1, 0, R1}·(1+j)/$\sqrt{2}$, where
L1 is expressed as {M, 1, −M}, R1 is expressed as {−M, 1, −M}, −L1 is expressed as {−M, −1, M}, and −R1 is expressed as {M, −1, M}.

In the foregoing technical solution, the 240-MHz bandwidth has 3072 tones in total. When the periodicity included in the short training field is 0.8 μs, the short training sequence may be expressed as $S_{-1520:16:1520}$, where −1520 indicates a subscript of a starting tone, 1520 indicates a subscript of an ending tone, 16 indicates a spacing, and −1520:16:1520 indicates starting with a tone whose subscript is −1520 and ending with a tone whose subscript is 1520, with a spacing of 16 tones in between. On other tones, a frequency-domain sequence value is 0. Therefore, the values given by the foregoing short training sequence each correspond to a frequency-domain sequence value that starts with a tone whose subscript is −1520 and ends with a tone whose subscript is 1520, with a spacing of 16 tones in between. L1 and R1 are sequences related to a short training sequence corresponding to an 80-MHz short training field with a periodicity of 0.8 µs. Therefore, the 240-MHz short training sequence can be compatible with the 80-MHz short training sequence. In addition, the 240-MHz short training sequence can support automatic gain control on a high-bandwidth (the bandwidth is greater than 160 MHz) channel. In addition, it is verified through simulation that these short training sequences have comparatively small peak-to-average power ratios, and therefore can support automatic gain control on a high-bandwidth channel and can improve an estimation effect for an automatic gain control circuit at a receive end, thereby reducing a receive bit error rate.

With reference to the first aspect, in some implementations of the first aspect, the bandwidth of the target channel is 240 MHz; and when the periodicity included in the short training field is 1.6 µs, the short training sequence is expressed as follows:

{L2, −1, −R2, −1, L2, 0, R2, 1, −L2, 1, −R2}·(1+j)/√2; or
{−L2, 1, R2, 1, −L2, 0, −R2, −1, L2, −1, R2}·(1+j)/√2; or
{L2, 0, −R2, −1, L2, 0, R2, 1, −L2, 1, −R2}·(1+j)/√2; or
{−L2, 0, R2, 1, −L2, 0, −R2, −1, L2, −1, R2}·(1+j)/√2; or
{L2, −1, −R2, −1, L2, 0, R2, 1, −L2, 0, −R2}·(1+j)/√2; or
{−L2, 1, R2, 1, −L2, 0, −R2, −1, L2, 0, R2}·(1+j)/√2; or
{L2, −1, −R2, −1, L2, 0, R2, 0, −L2, 1, −R2}·(1+j)/√2; or
{−L2, 1, R2, 1, −L2, 0, −R2, 0, L2, −1, R2}·(1+j)/√2; or
{L2, −1, −R2, 0, L2, 0, R2, 1, −L2, 1, −R2}·(1+j)/√2; or
{−L2, 1, R2, 0, −L2, 0, −R2, −1, L2, −1, R2}·(1+j)/√2,
where L2 is expressed as {M, −1, M, −1, −M, −1, M}, R2 is expressed as {−M, 1, M, 1, −M, 1, −M}, −L2 is expressed as {−M, 1, −M, 1, M, 1, −M}, and −R2 is expressed as {M, −1, −M, −1, M, −1, M}.

In the foregoing technical solution, the 240-MHz bandwidth has 3072 tones in total. When the periodicity included in the short training field is 1.6 µs, the short training sequence may be expressed as $S_{-1528:8:1528}$, where −1528 indicates a subscript of a starting tone, 1528 indicates a subscript of an ending tone, 8 indicates a spacing, and −1528:8:1528 indicates starting with a tone whose subscript is −1528 and ending with a tone whose subscript is 1528, with a spacing of 8 tones in between. On other tones, a frequency-domain sequence value is 0. Therefore, the values given by the foregoing short training sequence each correspond to a frequency-domain sequence value that starts with a tone whose subscript is −1528 and ends with a tone whose subscript is 1528, with a spacing of 8 tones in between. L2 and R2 are sequences related to an 80-MHz and 1.6-µs short training sequence. Therefore, the 240-MHz short training sequence can be compatible with the 80-MHz short training sequence. In addition, the 240-MHz short training sequence can support automatic gain control on a high-bandwidth (the bandwidth is greater than 160 MHz) channel. In addition, it is verified through simulation that these short training sequences have comparatively small peak-to-average power ratios, and therefore can support automatic gain control on a high-bandwidth channel and can improve an estimation effect for an automatic gain control circuit at a receive end, thereby reducing a receive bit error rate.

With reference to the first aspect, in some implementations of the first aspect, the bandwidth of the target channel is 320 MHz; and when a periodicity included in the short training field is 0.8 µs, the short training sequence is expressed as follows:

{L1, 0, −R1, 0, L1, 0, R1, 0, L1, 0, −R1, −1, −L1, 0, −R1}·(1+j)/√2; or
{−L1, 0, R1, 0, −L1, 0, −R1, 0, −L1, 0, R1, 1, L1, 0, R1}·(1+j)/√2; or
{L1, 0, −R1, −1, L1, 0, R1, 0, L1, 0, −R1, −1, −L1, 0, −R1}·(1+j)/√2; or
{−L1, 0, R1, 1, −L1, 0, −R1, 0, −L1, 0, R1, 1, L1, 0, R1}·(1+j)/√2; or
{L1, 0, −R1, 0, −L1, 0, R1, 0, −L1, 0, −R1, −1, −L1, 0, −R1}·(1+j)/√2; or
{−L1, 0, R1, 0, L1, 0, −R1, 0, L1, 0, R1, 1, L1, 0, R1}·(1+j)/√2; or
{L1, 0, −R1, 0, L1, 0, −R1, 0, −L1, 0, −R1, 0, L1, 0, R1}·(1+j)/√2; or
{−L1, 0, R1, 0, −L1, 0, R1, 0, L1, 0, R1, 0, −L1, 0, −R1}·(1+j)/√2; or
{L1, 0, −R1, 1, L1, 0, −R1, 0, −L1, 0, −R1, −1, L1, 0, R1}·(1+j)/√2; or
{−L1, 0, R1, −1, −L1, 0, R1, 0, L1, 0, R1, 1, −L1, 0, −R1}·(1+j)/√2, where L1 is expressed as {M, 1, −M}, R1 is expressed as {−M, 1, −M}, −L1 is expressed as {−M, −1, M}, and −R1 is expressed as {M, −1, M}.

In the foregoing technical solution, the 320-MHz bandwidth has 4096 tones in total. When the periodicity included in the short training field is 0.8 µs, the short training sequence may be expressed as $S_{-2032:16:2032}$, where −2032 indicates a subscript of a starting tone, 2032 indicates a subscript of an ending tone, 16 indicates a spacing, and −2032:16:2032 indicates starting with a tone whose subscript is −2032 and ending with a tone whose subscript is 2032, with a spacing of 16 tones in between. On other tones, a frequency-domain sequence value is 0. Therefore, the values given by the foregoing short training sequence each correspond to a frequency-domain sequence value that starts with a tone whose subscript is −2032 and ends with a tone whose subscript is 2032, with a spacing of 16 tones in between. L1 and R1 are sequences related to a short training sequence corresponding to 80 MHz and the periodicity of 0.8 µs. Therefore, the 320-MHz short training sequence can be compatible with the 80-MHz short training sequence. In addition, the 320-MHz short training sequence can support automatic gain control on a high-bandwidth (the bandwidth is greater than 160 MHz) channel. In addition, it is verified through simulation that these short training sequences have comparatively small peak-to-average power ratios, and therefore can support automatic gain control on a high-bandwidth channel and can improve an estimation effect for an automatic gain control circuit at a receive end, thereby reducing a receive bit error rate.

With reference to the first aspect, in some implementations of the first aspect, the bandwidth of the target channel is 320 MHz; and when a periodicity included in the short training field is 0.8 µs, the short training sequence is expressed as follows:

{L3, 0, R3, 0, −L3, −1, R3}·(1+j)/√2; or
{−L3, 0, −R3, 0, L3, 1, −R3}·(1+j)/√2; or
{L3, 0, R3, 0, −L3, 0, R3}·(1+j)/√2; or
{−L3, 0, −R3, 0, L3, 0, −R3}·(1+j)/√2; or
{L3, 1, −R3, 0, −L3, 1, −R3}·(1+j)/√2; or
{−L3, −1, R3, 0, L3, −1, R3}·(1+j)/√2; or
{L3, 1, −R3, 0, −L3, 0, −R3}·(1+j)/√2; or
{−L3, −1, R3, 0, L3, 0, R3}·(1+j)/√2; or
{L3, 1, R3, 0, −L3, −1, R3}·(1+j)/√2; or $\{-L3, -1, -R3, 0, L3, 1, -R3\}\cdot(1+j)/\sqrt{2}$, where L3 is expressed as $\{M, 1, -M, 0, -M, 1, -M\}$, R3 is expressed as $\{-M, -1, M, 0, -M, 1, -M\}$, $-L3$ is expressed as $\{-M, -1, M, 0, M, -1, M\}$, and $-R3$ is expressed as $\{M, 1, -M, 0, M, -1, M\}$.

In the foregoing technical solution, the 320-MHz bandwidth has 4096 tones in total. When the periodicity included in the short training field is 0.8 μs, the short training sequence may be expressed as $S_{-2032:16:2032}$, where $-2032$ indicates a subscript of a starting tone, 2032 indicates a subscript of an ending tone, 16 indicates a spacing, and $-2032:16:2032$ indicates starting with a tone whose subscript is $-2032$ and ending with a tone whose subscript is 2032, with a spacing of 16 tones in between. On other tones, a frequency-domain sequence value is 0. Therefore, the values given by the foregoing short training sequence each correspond to a frequency-domain sequence value that starts with a tone whose subscript is $-2032$ and ends with a tone whose subscript is 2032, with a spacing of 16 tones in between. L3 and R3 are sequences related to a short training sequence corresponding to 160 MHz and the periodicity of 0.8 μs. Therefore, the 320-MHz short training sequence can be compatible with the 160-MHz short training sequence. In addition, the 320-MHz short training sequence can support automatic gain control on a high-bandwidth (the bandwidth is greater than 160 MHz) channel. In addition, it is verified through simulation that these short training sequences have comparatively small peak-to-average power ratios, and therefore can support automatic gain control on a high-bandwidth channel and can improve an estimation effect for an automatic gain control circuit at a receive end, thereby reducing a receive bit error rate.

With reference to the first aspect, in some implementations of the first aspect, the bandwidth of the target channel is 320 MHz; and when the periodicity included in the short training field is 1.6 μs, the short training sequence is expressed as follows:

$\{L2, 0, -R2, -1, L2, 0, -R2, 0, L2, 0, R2, -1, -L2, 0, -R2\}\cdot(1+j)/\sqrt{2}$; or $\{-L2, 0, R2, 1, -L2, 0, R2, 0, -L2, 0, -R2, 1, L2, 0, R2\}\cdot(1+j)/\sqrt{2}$; or $\{L2, 0, -R2, 0, L2, 0, -R2, 0, L2, 0, R2, -1, -L2, 0, -R2\}\cdot(1+j)/\sqrt{2}$; or $\{-L2, 0, R2, 0, -L2, 0, R2, 0, -L2, 0, -R2, 1, L2, 0, R2\}\cdot(1+j)/\sqrt{2}$; or $\{L2, 0, -R2, -1, L2, 0, -R2, 0, L2, 0, R2, 0, -L2, 0, -R2\}\cdot(1+j)/\sqrt{2}$; or $\{-L2, 0, R2, 1, -L2, 0, R2, 0, -L2, 0, -R2, 0, L2, 0, R2\}\cdot(1+j)/\sqrt{2}$; or $\{L2, 0, -R2, 1, L2, 0, -R2, 0, L2, 0, R2, -1, -L2, 0, -R2\}\cdot(1+j)/\sqrt{2}$; or $\{-L2, 0, R2, -1, -L2, 0, R2, 0, -L2, 0, -R2, 1, L2, 0, R2\}\cdot(1+j)/\sqrt{2}$; or $\{L2, 0, -R2, 0, L2, 0, -R2, 0, L2, 0, R2, 0, -L2, 0, -R2\}\cdot(1+j)/\sqrt{2}$; or $\{-L2, 0, R2, 0, -L2, 0, R2, 0, -L2, 0, -R2, 0, L2, 0, R2\}\cdot(1+j)/\sqrt{2}$, where L2 is expressed as $\{M, -1, M, -1, -M, -1, M\}$, R2 is expressed as $\{-M, 1, M, 1, -M, 1, -M\}$, $-L2$ is expressed as $\{-M, 1, -M, 1, M, 1, -M\}$, and $-R2$ is expressed as $\{M, -1, -M, -1, M, -1, M\}$.

In the foregoing technical solution, the 320-MHz bandwidth has 4096 tones in total. When the periodicity included in the short training field is 1.6 μs, the short training sequence may be expressed as $S_{-2024:8:2024}$, where $-2024$ indicates a subscript of a starting tone, 2024 indicates a subscript of an ending tone, 8 indicates a spacing, and $-2024:8:2024$ indicates starting with a tone whose subscript is $-2024$ and ending with a tone whose subscript is 2024, with a spacing of 8 tones in between. On other tones, a frequency-domain sequence value is 0. Therefore, the values given by the foregoing short training sequence each correspond to a frequency-domain sequence value that starts with a tone whose subscript is $-2024$ and ends with a tone whose subscript is 2024, with a spacing of 8 tones in between. L2 and R2 are sequences related to a short training sequence corresponding to 80 MHz and the periodicity of 1.6 μs. Therefore, the 320-MHz short training sequence can be compatible with the 80-MHz short training sequence. In addition, the 320-MHz short training sequence can support automatic gain control on a high-bandwidth (the bandwidth is greater than 160 MHz) channel. In addition, it is verified through simulation that these short training sequences have comparatively small peak-to-average power ratios, and therefore can support automatic gain control on a high-bandwidth channel and can improve an estimation effect for an automatic gain control circuit at a receive end, thereby reducing a receive bit error rate.

With reference to the first aspect, in some implementations of the first aspect, the bandwidth of the target channel is 320 MHz; and when the periodicity included in the short training field is 1.6 μs, the short training sequence is expressed as follows:

$\{L4, 1, R4, 0, L4, -1, -R4\}\cdot(1+j)/\sqrt{2}$; or $\{-L4, -1, -R4, 0, -L4, 1, R4\}\cdot(1+j)/\sqrt{2}$; or $\{L4, 0, R4, 0, L4, 0, -R4\}\cdot(1+j)/\sqrt{2}$; or $\{-L4, 0, -R4, 0, -L4, 0, R4\}\cdot(1+j)/\sqrt{2}$; or $\{L4, 0, R4, 0, L4, -1, -R4\}\cdot(1+j)/\sqrt{2}$; or $\{-L4, 0, -R4, 0, -L4, 1, R4\}\cdot(1+j)/\sqrt{2}$; or $\{L4, 0, -R4, 0, L4, 1, R4\}\cdot(1+j)/\sqrt{2}$; or $\{-L4, 0, R4, 0, -L4, -1, -R4\}\cdot(1+j)/\sqrt{2}$; or $\{L4, 1, R4, 0, L4, 0, -R4\}\cdot(1+j)/\sqrt{2}$; or $\{-14, -1, -R4, 0, -L4, 0, R4\}\cdot(1+j)/\sqrt{2}$, where L4 is expressed as $\{M, -1, M, -1, -M, -1, M, 0, -M, 1, M, 1, -M, 1, -M\}$;

R4 is expressed as $\{-M, 1, -M, 1, M, 1, -M, 0, -M, 1, M, 1, -M, 1, -M\}$;

$-L4$ is expressed as $\{-M, 1, -M, 1, M, 1, -M, 0, M, -1, -M, -1, M, -1, M\}$; and $-R4$ is expressed as $\{M, -1, M, -1, -M, -1, M, 0, M, -1, -M, -1, M, -1, M\}$.

In the foregoing technical solution, the 320-MHz bandwidth has 4096 tones in total. When the periodicity included in the short training field is 1.6 μs, the short training sequence may be expressed as $S_{-2040:8:2040}$, where $-2040$ indicates a subscript of a starting tone, 2040 indicates a subscript of an ending tone, 8 indicates a spacing, and $-2040:8:2040$ indicates starting with a tone whose subscript is $-2040$ and ending with a tone whose subscript is 2040, with a spacing of 8 tones in between. On other tones, a frequency-domain sequence value is 0. Therefore, the values given by the foregoing short training sequence each correspond to a frequency-domain sequence value that starts with a tone whose subscript is $-2040$ and ends with a tone whose subscript is 2040, with a spacing of 8 tones in between. L4 and R4 are sequences related to a short training sequence corresponding to 160 MHz and the periodicity of 1.6 μs. Therefore, the 320-MHz short training sequence can be compatible with the 160-MHz short training sequence. In addition, the 320-MHz short training sequence can support automatic gain control on a high-bandwidth (the bandwidth is greater than 160 MHz) channel. In addition, it is verified through simulation that these short training sequences have comparatively small peak-to-average power ratios, and therefore can support automatic gain control on a high-bandwidth channel and can improve an estimation effect for an automatic gain control circuit at a receive end, thereby reducing a receive bit error rate.

According to a second aspect, a short training field sending apparatus is provided. The apparatus includes: a determining module, configured to determine a short training sequence; and a sending module, configured to send a short training field on a target channel, where the short training field is obtained by performing inverse fast Fourier transformation IFFT on the short training sequence, and a bandwidth of the target channel is greater than 160 MHz.

According to a third aspect, a short training field sending apparatus is provided. The apparatus includes: a processor, configured to determine a short training sequence; and a transceiver, configured to send a short training field on a target channel, where the short training field is obtained by performing inverse fast Fourier transformation IFFT on the short training sequence, and a bandwidth of the target channel is greater than 160 MHz.

According to a fourth aspect, a processor is provided, including an input circuit, an output circuit, and a processing circuit. The processing circuit is configured to receive a signal by using the input circuit, and transmit a signal by using the output circuit, so that the processor performs the method according to any one of the first aspect or the possible implementations of the first aspect.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter, and transmitted by the transmitter. In addition, the input circuit and the output circuit may be a same circuit, and the circuit serves as the input circuit and the output circuit at different moments. Specific implementations of the processor and various circuits are not limited in this embodiment of this application.

According to a fifth aspect, a communications device is provided, including a processor, and optionally, further including a memory. The memory is coupled to the processor, and the processor is configured to perform the method according to any one of the first aspect or the possible implementations of the first aspect.

Optionally, there are one or more processors, and there are one or more memories.

Optionally, the memory may be integrated with the processor, or the memory and the processor are disposed separately.

During specific implementation, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

Optionally, the processor includes at least one circuit configured to determine a short training sequence, and includes at least one circuit configured to transmit the short training field by using the transmitter.

The processor in the fifth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in a memory. The memory may be integrated in the processor, or may be located outside the processor and exist independently.

According to a sixth aspect, a computer program is provided. When the computer program is executed by a computer, the computer program is used to perform the method according to any one of the first aspect or the possible implementations of the first aspect. The computer program may be entirely or partially stored in a storage medium packaged with a processor, or may be partially or entirely stored in a memory not packaged with a processor.

According to a seventh aspect, a computer-readable storage medium is provided. The computer-readable storage medium stores a computer program. The computer program includes at least one segment of code. The at least one segment of code may be executed by a computer, to control the computer to perform the method according to any one of the first aspect or the possible implementations of the first aspect.

DETAILED DESCRIPTION OF ILLUSTRATIVE EMBODIMENTS

The following describes the technical solutions in this application with reference to the accompanying drawings.

The technical solutions in the embodiments of this application may be applied to various communications systems, for example, a wireless local area network (WLAN) communications system, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, LTE time division duplex (TDD) system, a universal mobile telecommunications system (UMTS), a worldwide interoperability for microwave access (WiMAX) communications system, a 5th generation (5G) system, or new radio (NR) system.

In the following example descriptions, only a WLAN system is used as an example to describe an application scenario and a method in the embodiments of this application.

Specifically, the embodiments of this application may be applied to a wireless local area network (WLAN), and the embodiments of this application is applicable to any protocol of Institute of Electrical and Electronics Engineers (IEEE) 802.11 series protocols currently used for the WLAN. The WLAN may include one or more basic service sets (BSS), and a network node in the basic service set includes an access point (AP) and a station (STA).

Specifically, in the embodiments of this application, an initiation device and a response device each may be a subscriber station (STA) on the WLAN. The subscriber station may also be referred to as a system, a subscriber unit, an access terminal, a mobile station, a mobile console, a remote station, a remote terminal, a mobile device, a user terminal, a terminal, a wireless communications device, a user agent, a user apparatus, or user equipment (UE). The STA may be a cellular phone, a cordless phone, a session initiation protocol (SIP) phone, a wireless local loop (WLL) station, a personal digital assistant (PDA), a handheld device with a wireless local area network (for example, Wi-Fi) communication function, a wearable device, a computing device, or another processing device connected to a wireless modem.

Alternatively, in the embodiments of this application, the initiation device and the response device each may be an AP on the WLAN. The AP may be configured to communicate with an access terminal through a wireless local area network, and transmit data of the access terminal to a network side, or transmit data from the network side to the access terminal.

Figure 1:
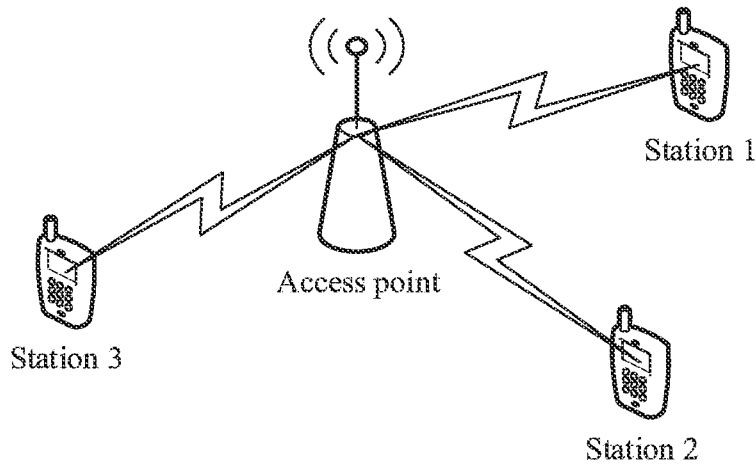
FIG. 1 is a schematic diagram of a communications system to which a short training field sending method according to an embodiment of this application is applicable.

For ease of understanding the embodiments of this application, a communications system shown in FIG. 1 is first used as an example to describe in detail a communications system to which the embodiments of this application are applicable. In a scenario shown in FIG. 1, the system may be a WLAN system. The WLAN system in FIG. 1 may include one or more APs and one or more STAs. In FIG. 1, one AP and three STAs are used as examples. The AP and the STAs may wirelessly communicate with each other by using various standards. For example, wireless communication may be performed between the AP and the STAs by using a single-user multiple-input multiple-output (SU-MIMO) technology or a multi-user multiple-input multiple-output (MU-MIMO) technology.

Figure 2:
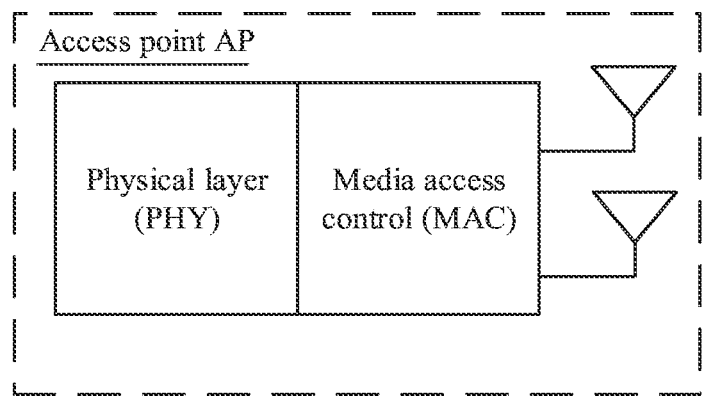
FIG. 2 is an internal structural diagram of a wireless access point to which an embodiment of this application is applicable.

The AP is also referred to as a wireless access point, a hotspot, or the like. The AP is an access point for a mobile subscriber to access a wired network, and is mainly deployed in a home, a building, or a campus, or may be deployed outdoors. The AP is equivalent to a bridge that connects the wired network and a wireless network. A main function of the AP is to connect various wireless network clients, and then connect the wireless network to the Ethernet. Specifically, the AP may be a terminal device or a network device with a wireless fidelity (Wi-Fi) chip. Optionally, the AP may be a device that supports a plurality of WLAN standards such as 802.11. FIG. 2 is an internal structural diagram of an AP product. The AP may have a plurality of antennas or a single antenna. In FIG. 2, the AP includes a physical layer (PHY) processing circuit and a media access control (MAC) layer processing circuit. The physical layer processing circuit may be configured to process a physical layer signal, and the MAC layer processing circuit may be configured to process a MAC layer signal.

The 802.11 standard focuses on a PHY and a MAC layer, and the embodiments of this application focus on protocol design on the MAC layer and the PHY.

Figure 3:
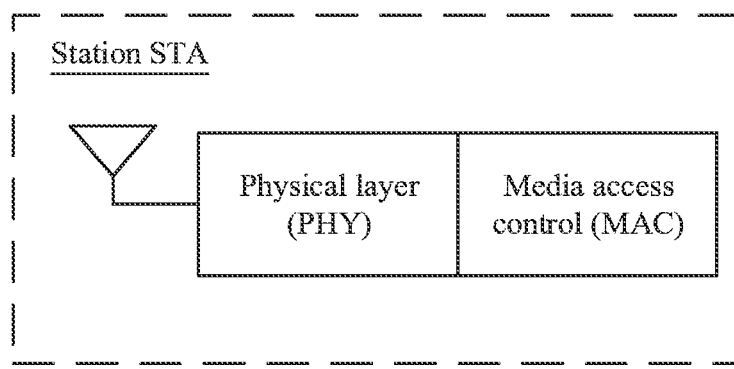
FIG. 3 is an internal structural diagram of a subscriber station to which an embodiment of this application is applicable.

A STA product is usually a terminal product supporting 802.11 series standards, for example, a mobile phone or a notebook computer. FIG. 3 is a structural diagram of a STA with a single antenna. In an actual scenario, the STA may alternatively have a plurality of antennas, and may be a device with more than two antennas. In FIG. 3, the STA may include a physical layer (PHY) processing circuit and a media access control (MAC) layer processing circuit. The physical layer processing circuit may be configured to process a physical layer signal, and the MAC layer processing circuit may be configured to process a MAC layer signal.

To greatly increase a service transmission rate of a WLAN system, in the IEEE 802.11ax standard, an orthogonal frequency division multiple access (OFDMA) technology is further used based on an existing orthogonal frequency division multiplexing (OFDM) technology. The OFDMA technology enables a plurality of nodes to simultaneously transmit and receive data, thereby achieving a multi-station diversity gain.

During evolution from 802.11a to 802.11g, 802.11n, 802.11ac, and 802.11ax, available frequency bands include 2.4 gigahertz (GHz) and 5 GHz. As a quantity of open frequency bands increases, a maximum channel bandwidth supported by 802.11 is extended from 20 megahertz (MHz) to 40 MHz and then to 160 MHz. In 2017, the US Federal Communications Commission (FCC) opened a new free 6-GHz frequency band (5925-7125 MHz), and workers of the 802.11ax standard extended an operating range of 802.11ax devices from 2.4 GHz and 5 GHz to 2.4 GHz, 5 GHz, and 6 GHz in the 802.11ax project authorization requests (PAR). Because an available bandwidth of the newly opened 6-GHz frequency band is higher, it can be predicted that a channel bandwidth greater than 160 MHz is to be supported in evolution of a next-generation standard after 802.11ax.

Figure 4:
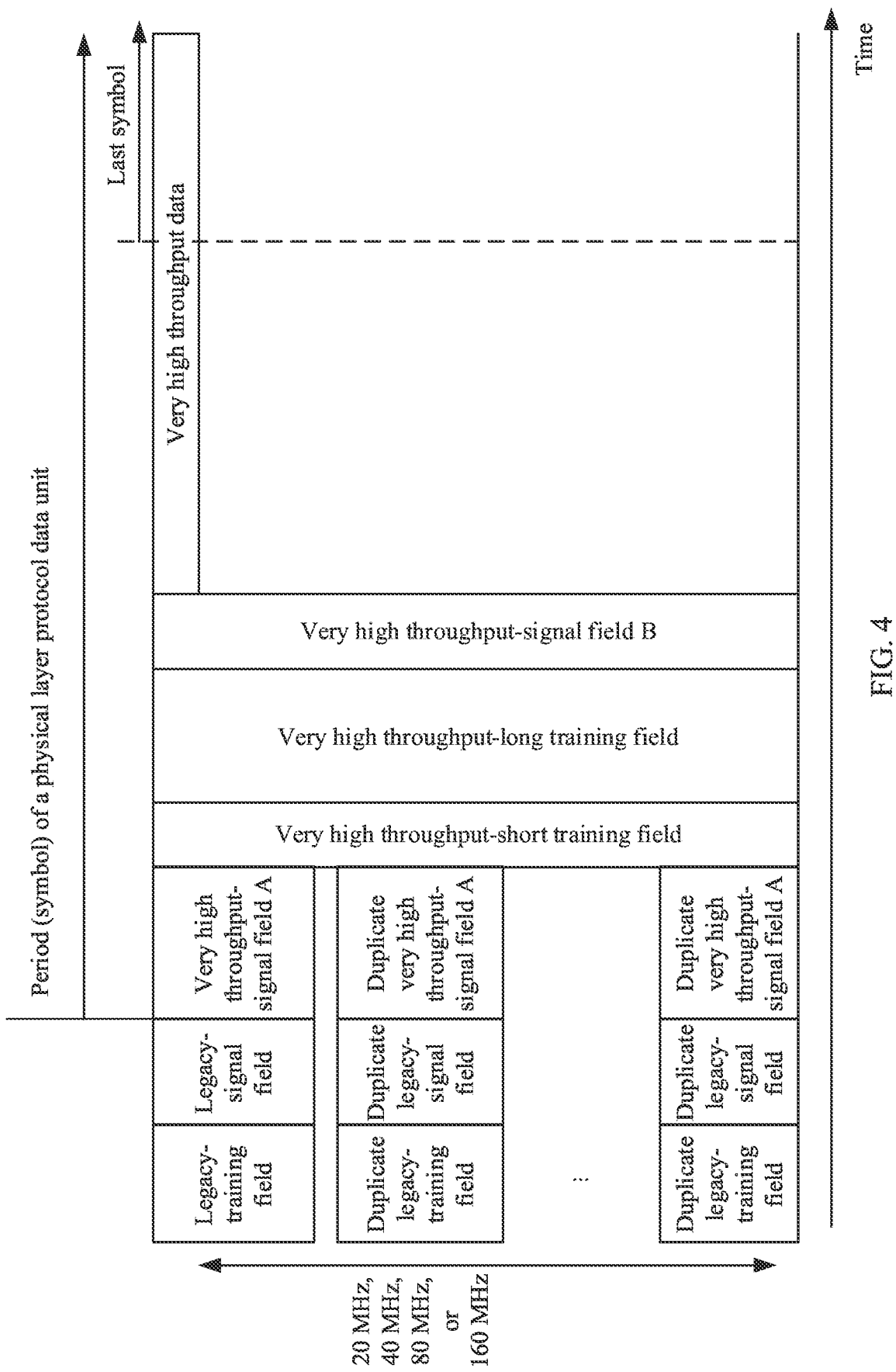
FIG. 4 is a schematic diagram of a VHT frame structure in 802.11ac.

Each generation of mainstream 802.11 protocol is compatible with legacy stations. For example, a frame structure in 802.11a for an earliest generation of mainstream Wi-Fi starts with a preamble, and includes a legacy-short training field (L-STF), a legacy-long training field (L-LTF), and a legacy-signal field (L-SIG). For compatibility with legacy stations, a frame structure in subsequent 802.11 and 802.11ax that is being finalized starts with a legacy preamble. The legacy preamble is followed by a signal field, a short training field, and a long training field that are newly defined for each generation. The short training field (STF) after the legacy preamble is referred to as an extremely high throughput-short training field (EHT-STF) for differentiation from the L-STF. When transmission is performed at a channel bandwidth greater than 20 MHz, the L-STF is replicated and then transmitted on every 20-MHz channel bandwidth. These EHT-STFs introduced after 802.11a are separately defined as new sequences for a channel bandwidth greater than 20 MHz. For example, for an STF defined in 802.11ac, that is, a very high throughput-short training field (VHT-STF), 20-MHz, 40-MHz, 80-MHz, and 160-MHz sequences are separately defined, as shown in FIG. 4. FIG. 4 is a schematic diagram of a VHT frame structure in 802.11ac. Similarly, a high efficiency-short training field (HE-STF) defined in 802.11ax also supports a maximum channel bandwidth of 160 MHz. FIG. 4 includes a legacy-training field (L-TF), a duplicate legacy-training field (Dup L-TF), a legacy-signal field (L-SIG), a duplicate legacy-signal field (Dup L-SIG), a very high throughput-signal field-A (VHT-SIG-A), a duplicate very high throughput-signal field-A (Dup VHT-SIG-A), a very high throughput-short training field (VHT-STF), a very high throughput-long training field (VHT-LTF), a very high throughput-signal field-B (VHT-SIG-B), and very high throughput data (VHT Data).

According to stipulations of a protocol, a time-domain waveform of the HE-STF includes five repetitions, and is mainly used to enhance an estimation of an automatic gain control (AGC) circuit in multiple-input multiple-output (MIMO) transmission; therefore, it is required that a smaller peak-to-average power ratio (PAPR) of a sequence should be better. As described above, a next-generation protocol of 802.11 is expected to support a channel bandwidth greater than 160 MHz.

Therefore, a new short training sequence needs to be designed for a new channel bandwidth. In view of this, for a new channel bandwidth, this application proposes a short training sequence design corresponding to a next-generation STF.

For ease of understanding the embodiments of this application, the following first briefly describes several nouns or terms used in this application.

1. Tone: A wireless communication signal has a limited bandwidth. An OFDM technology may be used to divide a channel bandwidth into a plurality of frequency components within the bandwidth based on a specific frequency spacing. These components are referred to as tones.

2. Short Training Sequence

The short training sequence is mainly used for signal detection, automatic gain control (AGC), symbol timing acquisition, coarse frequency offset estimation, and the like. Different sequences may be defined for different maximum channel bandwidths. For example, the HE-STF defined in 802.11ax supports a maximum channel bandwidth of 160 MHz. This application focuses on a channel bandwidth greater than 160 MHz, therefore, for differentiation, is referred to as an EHT-STF in the embodiments of this application. It should be understood that the EHT-STF is used to represent a short training field for a bandwidth greater than 160 MHz, and a specific name of the EHT-STF does not limit the protection scope of the embodiments of this application.

The short training sequence may be constructed based on an M-sequence. For example, it can be learned from the 802.11ax standard that a high efficiency-short training sequence (HES-STF) is constructed by performing multiplexing, phase rotation, and combination based on the M-sequence. The M-sequence is a most basic pseudo-noise sequence (PN sequence) currently used in a CDMA system. The M-sequence is short for a maximum-length linear feedback shift register sequence. The M-sequence is defined as M={−1, −1, −1, 1, 1, 1, −1, 1, 1, 1, −1, 1, 1, −1, 1} in the 802.11ax standard.

It should be noted that a specific name of the M-sequence does not limit the protection scope of the embodiments of this application. For example, the M-sequence may also be referred to as a frequency-domain sequence.

3. Peak-to-Average Power Ratio

The peak-to-average power ratio (PAPR) may be a ratio of an instantaneous peak power of continuous signals to an average signal power within a symbol, and may be expressed by using the following formula:

$$PAPR = 10\log_{10}\left(\frac{\max(X_i^2)}{\text{mean}(X_i^2)}\right),$$

where
  $X_i$ indicates a time-domain discrete value of a sequence;
  $\max(X_i^2)$ indicates a maximum value of a square of the time-domain discrete value; and
  $\text{mean}(X_i^2)$ indicates an average value of the square of the time-domain discrete value.

According to stipulations of a protocol, a time-domain waveform of an HE-STF includes five repetitions, and is mainly used to enhance an AGC estimation in MIMO transmission; therefore, it is required that a smaller PAPR of a sequence should be better.

It should be noted that, in the embodiments of this application, the "protocol" may be a standard protocol in the communications field, for example, may include an LTE protocol, an NR protocol, a WLAN protocol, and a related protocol applied to a future communications system. This is not limited in this application.

It should be further noted that, in the embodiments of this application, "pre-obtaining" may include being indicated by a network device through signaling, or being predefined, for example, being defined in a protocol. The "predefining" may be implemented by prestoring corresponding code or a table on a device (for example, including a terminal device and a network device), or in another manner that may be used to indicate related information. A specific implementation thereof is not limited in this application. For example, the predefining may mean being defined in a protocol.

It should be further noted that "storing" in the embodiments of this application may mean being stored in one or more memories. The one or more memories may be separately disposed, or may be integrated in an encoder, a decoder, a processor, or a communications apparatus. Alternatively, some of the one or more memories may be separately disposed, and some of the one or more memories are integrated in a decoder, a processor, or a communications apparatus. A type of the memory may be a storage medium in any form. This is not limited in this application.

It should be further noted that, in the embodiments of this application, one of "of (of)", "relevant", and "corresponding" may be used sometimes. It should be noted that expressed meanings are consistent when differences are not emphasized.

It should be further noted that, in the following embodiments, first, second, and third are merely intended to distinguish between different objects, and should not constitute any limitation on this application, for example, are intended to distinguish between different channel bandwidths.

It should be further noted that "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. Similar to "A and/or B", "at least one of A and B" describes an association relationship for describing associated objects and represents that three relationships may exist. For example, at least one of A and B may represent the following three cases: Only A exists, both A and B exist, and only B exists. The following describes in detail the technical solutions provided in this application with reference to the accompanying drawings.

Figure 5:
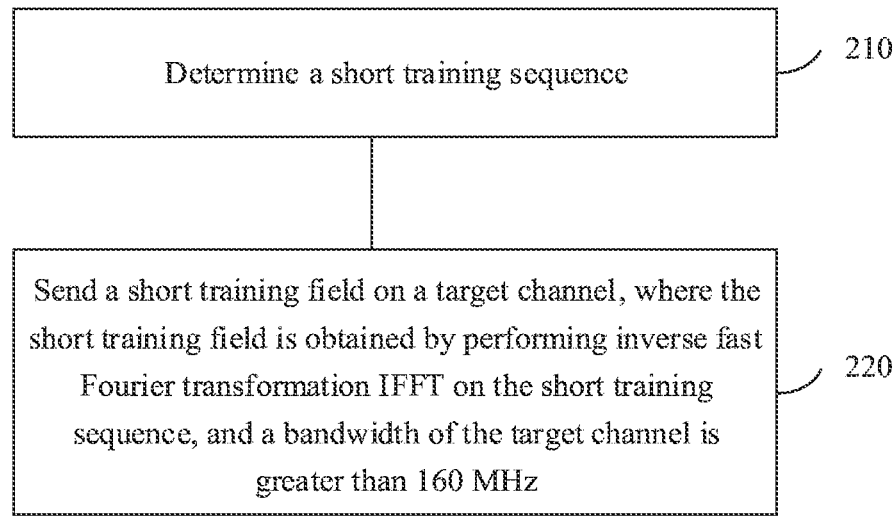
FIG. 5 is a schematic diagram of a short training field sending method according to an embodiment of this application.

It should be understood that the technical solutions in this application may be applied to a wireless communications system, for example, the wireless communications system shown in FIG. 1. FIG. 5 is a schematic block diagram of a short training field sending method according to an embodiment of this application. The method 200 shown in FIG. 5 includes step 210 and step 220.

Step 210: Determine a short training sequence.

Step 220: Send a short training field on a target channel, where the short training field is obtained by performing inverse fast Fourier transformation IFFT on the short training sequence, and a bandwidth of the target channel is greater than 160 MHz.

In this embodiment of this application, for differentiation from a legacy-short training field, the short training field corresponding to the bandwidth of the target channel is denoted as an EHT-STF. It should be understood that the EHT-STF is used to represent a short training field corresponding to a bandwidth greater than 160 MHz, and a specific name of the EHT-STF does not limit the protection scope of this embodiment of this application.

In this embodiment of this application, the bandwidth of the target channel is greater than 160 MHz. In this embodiment of this application, an example in which the bandwidth of the target channel is 240 MHz and an example in which the bandwidth of the target channel is 320 MHz are used for description. It should be understood that this embodiment of this application is not limited thereto. For example, the bandwidth of the target channel may be alternatively 200 MHz or 280 MHz.

Example 1: The Bandwidth of the Target Channel is 240 MHz

The EHT-STF is obtained by performing IFFT transformation on a frequency-domain sequence of the EHT-STF. In this application, for ease of description, the frequency-domain sequence of the EHT-STF is denoted as a short training sequence S (sequence), the EHT-STF may include a plurality of periods, and duration of each period may be 0.8 μs or 1.6 μs. For brevity, in this embodiment of this application, the duration of the period included in the EHT-STF is denoted as a periodicity. In this embodiment of this application, a scenario in which the periodicity is 0.8 μs and a scenario in which the periodicity is 1.6 μs are used to describe the EHT-STF for the bandwidth of the target channel.

Scenario 1: The Periodicity is 0.8 μs.

In this embodiment of this application, a short training sequence S corresponding to a 240-MHz EHT-STF with a periodicity of 0.8 μs may be determined by using at least the following three methods.

The 240-MHz bandwidth has 1024×3=3072 tones in total. There are 12 guard tones on a left edge, 11 guard tones on a right edge, and five direct-current tones in the middle of the bandwidth. In addition, when the periodicity included in the short training field is 0.8 μs, the short training sequence corresponding to the 240-MHz EHT-STF may be expressed as $S_{-1520:16:1520}$, where −1520 indicates a subscript of a starting tone, 1520 indicates a subscript of an ending tone, 16 indicates a spacing, and −1520:16:1520 indicates starting with a tone whose subscript is −1520 and ending with a tone whose subscript is 1520, with a spacing of 16 tones in between. On other tones, a frequency-domain sequence value is 0.

Method 1

Determine, based on a frequency-domain sequence HES of a reference channel, the short training sequence S corresponding to the 240-MHz EHT-STF with the periodicity of 0.8 μs.

For the HES, the 802.11ax standard defines a frequency-domain value $HES_{a:b:c}$ of the HE-STF, where a indicates a subscript of a starting tone, c indicates a subscript of an ending tone, b indicates a spacing, and a:b:c indicates starting with a tone a and ending with a tone c, with a spacing of b tones in between. On other tones, an HES value is 0. During sending, inverse Fourier transformation is performed on a frequency-domain value to obtain a time-domain waveform.

For example, a bandwidth of the reference channel is 80 MHz. Optionally, the short training sequence S corresponding to the EHT-STF with the periodicity of 0.8 μs and the channel bandwidth of 240 MHz may be expressed as follows:

{L1, 1, −R1, 1, −L1, 0, R1, 0, −L1, 0, −R1}·(1+j)/√2; or
{−L1, −1, R1, −1, L1, 0, −R1, 0, L1, 0, R1}·(1+j)/√2; or
{L1, 1, −R1, −1, −L1, 0, −R1, 1, L1, 1, R1}·(1+j)/√2; or
{−L1, −1, R1, 1, L1, 0, R1, −1, −L1, −1, −R1}·(1+j)/√2;
or
{L1, 1, −R1, 1, −L1, 0, R1, 1, −L1, 0, −R1}·(1+j)/√2; or
{−L1, −1, R1, −1, L1, 0, −R1, −1, L1, 0, R1}·(1+j)/√2; or
{L1, 0, −R1, 0, −L1, 0, R1, −1, −L1, 0, −R1}·(1+j)/√2; or
{−L1, 0, R1, 0, L1, 0, −R1, 1, L1, 0, R1}·(1+j)/√2; or
{L1, 1, −R1, 0, −L1, 0, R1, −1, −L1, 0, −R1}·(1+j)/√2; or
{−L1, −1, R1, 0, L1, 0, −R1, 1, L1, 0, R1}·(1+j)/√2, where
$L1 = HES_{Left\ 1} \cdot \sqrt{2}/(1+j) = HES_{-496:16:-16} \cdot \sqrt{2}/(1+j)$,
$R1 = HES_{Right\ 1} \cdot \sqrt{2}/(1+j) = HES_{16:16:496} \cdot \sqrt{2}/(1+j)$;

$HES_{Left\ 1}$ is a part of $HES_{-496:16:496}$ on the left of a tone 0, and $HES_{Right\ 1}$ is a part of $HES_{-496:16:496}$ on the right of the tone 0;

$HES_{-496:16:496}$ is an HES corresponding to 80 MHz and the periodicity of 0.8 μs; and L1 is expressed as {M, 1, −M}, R1 is expressed as {−M, 1, −M}, −L1 is expressed as {−M, −1, M}, and −R1 is expressed as {M, −1, M}.

As described above, the short training sequence corresponding to the 240-MHz EHT-STF may be expressed as $S_{-1520:16:1520}$. Therefore, the values given by the foregoing short training sequence each correspond to a frequency-domain sequence value that starts with a tone whose subscript is −1520 and ends with a tone whose subscript is 1520, with a spacing of 16 tones in between.

It should be noted that, in this embodiment of this application, L (for example, L1, L2, L3, and L4) and R (for example, R1, R2, R3, and R4), or $HES_{Left}$ (for example, $HES_{Left\ 1}$ and $HES_{Left\ 2}$) and $HES_{Right}$ (for example, $HES_{Right\ 1}$ and $HES_{Right\ 2}$) are used to indicate a part on the left of the tone 0 and a part on the right of the tone 0. Specifically, L1 indicates a part, on the left of the tone 0, of the HES corresponding to 80 MHz and the periodicity of 0.8 μs, and R1 indicates a part, on the right of the tone 0, of the HES corresponding to 80 MHz and the periodicity of 0.8 μs; L2 indicates a part, on the left of the tone 0, of an HES corresponding to 80 MHz and the periodicity of 1.6 μs, and R2 indicates a part, on the right of the tone 0, of the HES corresponding to 80 MHz and the periodicity of 1.6 μs; L3 indicates a part, on the left of the tone 0, of an HES corresponding to 160 MHz and the periodicity of 0.8 μs, and R3 indicates a part, on the right of the tone 0, of the HES corresponding to 160 MHz and the periodicity of 0.8 μs; L4 indicates a part, on the left of the tone 0, of an HES corresponding to 160 MHz and the periodicity of 1.6 μs, and R4 indicates a part, on the right of the tone 0, of the HES corresponding to 160 MHz and the periodicity of 1.6 μs. In addition, $L = HES_{Left} \cdot \sqrt{2}/(1+j)$, and $R = HES_{Right} \cdot \sqrt{2}/(1+j)$.

It should be further noted that L (for example, L1, L2, L3, and L4), R (for example, R1, R2, R3, and R4), and the like are only used to indicate a part on the left of the tone 0 and a part on the right of the tone 0, and names thereof (for example, L1, L2, L3, L4, R1, R2, R3, and R4) do not limit the protection scope of this embodiment of this application.

It should be understood that the short training sequence S corresponding to the EHT-STF with the periodicity of 0.8 µs and the channel bandwidth of 240 MHz may be expressed as any one of the foregoing 10 expressions.

It can be learned from the foregoing that, by using the method 1, the short training sequence S corresponding to the 240-MHz EHT-STF with the periodicity of 0.8 µs may be obtained through transformation based on an HES specified in a standard.

Method 2

Obtain, through transformation based on an M-sequence, the short training sequence S corresponding to the 240-MHz EHT-STF with the periodicity of 0.8 µs.

Specifically, L1 expressed as {M, 1, −M}, R1 expressed as {−M, 1, −M}, −L1 expressed as {−M, −1, M}, and −R1 expressed as {M, −1, M} are substituted, and it can be learned that the short training sequence S corresponding to the 240-MHz EHT-STF with the periodicity of 0.8 µs may be expressed as follows:

{M, 1, −M, 1, M, −1, M, 1, −M, −1, M, 0, −M, 1, −M, 0, −M, −1, M, 0, M, −1, M}·(1+j)/√2; or

{−M, −1, M, −1, −M, 1, −M, −1, M, 1, −M, 0, M, −1, M, 0, M, 1, −M, 0, −M, 1, −M}·(1+j)/√2; or

{M, 1, −M, 1, M, −1, M, −1, −M, −1, M, 0, M, −1, M, 1, M, 1, −M, 1, −M, 1, −M}·(1+j)/√2; or

{−M, −1, M, −1, −M, 1, −M, 1, M, 1, −M, 0, −M, 1, −M, −1, −M, −1, M, −1, M, −1, M}·(1+j)/√2; or

{M, 1, −M, 1, M, −1, M, 1, −M, −1, M, 0, −M, 1, −M, 1, −M, −1, M, 0, M, −1, M}·(1+j)/√2; or

{−M, −1, M, −1, −M, 1, −M, −1, M, 1, −M, 0, M, −1, M, −1, M, 1, −M, 0, −M, 1, −M}·(1+j)/√2; or

{M, 1, −M, 0, M, −1, M, 0, −M, −1, M, 0, −M, 1, −M, −1, −M, −1, M, 0, M, −1, M}·(1+j)/√2; or

{−M, −1, M, 0, −M, 1, −M, 0, M, 1, −M, 0, M, −1, M, 1, M, 1, −M, 0, −M, 1, −M}·(1+j)/√2; or

{M, 1, −M, 1, M, −1, M, 0, −M, −1, M, 0, −M, 1, −M, −1, −M, −1, M, 0, M, −1, M}·(1+j)/√2; or

{−M, −1, M, −1, −M, 1, −M, 0, M, 1, −M, 0, M, −1, M, 1, M, 1, −M, 0, −M, 1, −M}·(1+j)/√2.

Similarly, as described above, the short training sequence corresponding to the 240-MHz EHT-STF may be expressed as $S_{-1520:16:1520}$. Therefore, the values given by the foregoing short training sequence each correspond to a frequency-domain sequence value that starts with a tone whose subscript is −1520 and ends with a tone whose subscript is 1520, with a spacing of 16 tones in between.

It should be noted that the short training sequence S corresponding to the EHT-STF with the periodicity of 0.8 µs and the channel bandwidth of 240 MHz may be expressed as any one of the foregoing 10 expressions.

It can be learned from the foregoing that, by using the method 2, the short training sequence S corresponding to the 240-MHz EHT-STF with the periodicity of 0.8 µs may be obtained through transformation based on the M-sequence.

Method 3

The short training sequence S corresponding to the EHT-STF in the foregoing method 1 or method 2 is directly cached or stored locally. When the short training sequence S corresponding to the EHT-STF is to be used, the short training sequence S corresponding to the EHT-STF may be directly obtained locally.

It should be understood that the foregoing three methods are merely examples for description, and this application is not limited thereto. Any method that can be used to obtain the 240-MHz EHT-STF with the periodicity of 0.8 µs falls within the protection scope of this embodiment of this application.

The 240-MHz EHT-STF with the periodicity of 0.8 µs may be obtained through simulation calculation. For example, if the method 1 is used, the EHT-STF may be obtained through calculation based on a stored HE-STF by using a corresponding formula. For another example, if the method 2 is used, the EHT-STF may be obtained through calculation based on a stored or protocol-specified M-sequence by using a corresponding formula. Details are provided below.

Specifically, in this embodiment of this application, the short training sequence corresponding to the bandwidth of the target channel may be designed based on a short training sequence for an existing channel bandwidth (for example, the bandwidth of the reference channel). For brevity, the short training sequence for the bandwidth of the reference channel is referred to as a reference short training sequence. Without loss of generality, the following describes in detail a method for designing the short training sequence S corresponding to the 240-MHz EHT-STF in this embodiment of this application by using an example in which a reference short training field is an HE-STF and a target short training field is an EHT-STF.

Determining a short training sequence HES corresponding to an HE-STF for the bandwidth of the reference channel may be pre-obtaining a short training sequence HES, or directly using a short training sequence HES that corresponds to an HE-STF for a bandwidth of an existing reference channel and that is specified in a standard. This is not limited in this embodiment of this application. In this embodiment of this application, designing a short training sequence for a higher channel bandwidth based on a short training sequence for an existing channel bandwidth is mainly considered.

According to this embodiment of this application, in consideration of backward compatibility, a short training sequence for a higher channel bandwidth, for example, a short training sequence S corresponding to an EHT-STF, is designed based on a short training sequence HES corresponding to an STF for an existing channel bandwidth, for example, a short training sequence HES corresponding to an HE-STF.

For ease of understanding, a design, in 802.11ax, of a short training sequence HES corresponding to an HE-STF is first briefly described.

Figure 6:
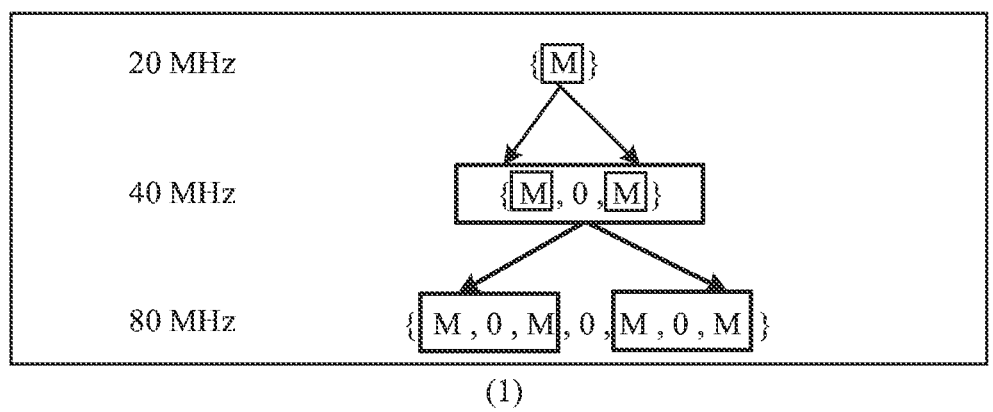
FIG. 6 is a schematic diagram of constructing an HE-STF by using an M-sequence.
Figure 6:
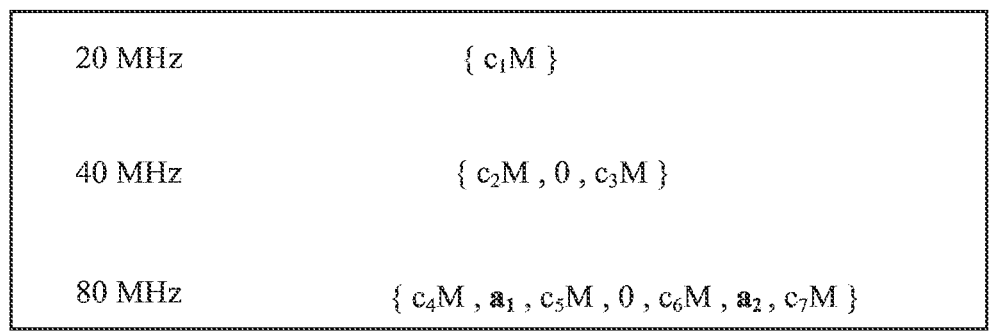

FIG. 6 is a schematic diagram of constructing an HE-STF by using an M-sequence. A diagram (1) in FIG. 6 is a repetition structure. Specifically, a 20-MHz HE-STF is constructed by using one M-sequence, a 40-MHz HE-STF is obtained by combining two 20-MHz HE-STFs (that is, two M-sequences), and similarly, an 80-MHz HE-STF is obtained by combining four 20-MHz HE-STFs. To ensure that the HE-STF includes five repetitions in time domain and a PAPR of the HE-STF is as small as possible, an additional parameter value and a rotation factor may be used for adjustment and optimization, as shown in a diagram (2) in FIG. 6. Specifically, a 20-MHz HE-STF is constructed by using one M-sequence, a 40-MHz HE-STF is obtained by combining two 20-MHz HE-STFs (that is, two M-sequences) that are multiplied by a rotation factor C, and similarly, an 80-MHz HE-STF is obtained by combining four 20-MHz HE-STFs that are multiplied by the rotation factor. In addition, a parameter value A needs to be inserted between every two M-sequences, to ensure that the HE-STF includes five repetitions in time domain. An exception is that an OFDM modulation scheme requires that a direct-current tone should be 0. Therefore, a PAPR of the HE-STF can be minimized by optimizing A and C. As shown in the diagram (2) in FIG. 6, the rotation factor C includes {c1, c2, c3, c4, . . . }, and the parameter value A includes {a1, a2, a3, a4, . . . }.

As described above, 802.11ax defines HE-STFs with two periodicities based on different frame structures defined in 802.11ax, where the periodicities are 0.8 μs and 1.6 μs. In addition, 802.11ax supports four channel bandwidths: 20 MHz, 40 MHz, 80 MHz, and 160 MHz. Each bandwidth and periodicity correspond to one HE-STF. Therefore, the HE-STF has eight frequency-domain values $HES_{a:b:c}$ in total.

The following separately describes optimized frequency-domain sequences for different channel bandwidths in a case in which a periodicity is 0.8 μs and a case in which a periodicity is 1.6 μs.

Case 1: frequency-domain sequence of a 0.8-μs HE-STF

A 0.8-μs HE-STF with a channel bandwidth of 20 MHz has 256 tones in total, and a subscript ranges from −127 to 128. A tone with a subscript of 0 corresponds to a direct-current component, a tone with a negative-number subscript corresponds to a frequency component lower than the direct-current component, and a tone with a positive-number subscript corresponds to a frequency component higher than the direct-current component.

$HES_{-112:16:112}$ may be expressed by using the following formula:

$$HES_{-112:16:112} = \{M\} \cdot (1+j), \text{ where } HES_0 = 0, \text{ and frequency-domain values of other tones are 0;}$$

$HES_{-112:16:112}$ indicates a frequency-domain sequence of the 20-MHz HE-STF, specifically, frequency-domain values of tones with subscripts of −112, −96, −80, −64, −48, −32, −16, 0, 16, 32, 48, 64, 80, 96, and 112; and the other tones are tones with remaining subscripts, within the subscript range from −127 to 128, other than the tones with the subscripts of −112, −96, −80, −64, −48, −32, −16, 0, 16, 32, 48, 64, 80, 96, and 112.

The foregoing formula is expanded as follows:

$$HES_{-112:16:112} = \{-(1+j)/\sqrt{2}, -(1+j)/\sqrt{2}, -(1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, (1+j)/\sqrt{2}, -(1+j)/\sqrt{2}, (1+j)/\sqrt{2}\}$$

Therefore, the frequency-domain values of the tones with the subscripts of −112, −96, −80, −64, −48, −32, −16, 0, 16, 32, 48, 64, 80, 96, and 112 are as follows: $-(1+j)/\sqrt{2}$, $-(1+j)/\sqrt{2}$, $-(1+j)/\sqrt{2}$, $(1+j)/\sqrt{2}$, $(1+j)/\sqrt{2}$, $(1+j)/\sqrt{2}$, $-(1+j)/\sqrt{2}$, $(1+j)/\sqrt{2}$, $(1+j)/\sqrt{2}$, $(1+j)/\sqrt{2}$, $-(1+j)/\sqrt{2}$, $(1+j)/\sqrt{2}$, $(1+j)/\sqrt{2}$, $-(1+j)/\sqrt{2}$, and $(1+j)/\sqrt{2}$ It should be noted that, in this embodiment of this application, expressions similar to $HES_{-112:16:112}$ in formulas have similar meanings. For brevity, details are not described again.

It should be further noted that, in this embodiment of this application, in the following descriptions of formulas, unless otherwise specified, frequency-domain values of tones with other subscripts are all 0. For brevity, details are not described again.

A 0.8-μs HE-STF with a channel bandwidth of 40 MHz has 512 tones in total, and a subscript ranges from −255 to 256. $HES_{-240:16:240}$ may be expressed by using the following formula:

$$HES_{-240:16:240} = \{M, 0, -M\} \cdot (1+j)/\sqrt{2}, \text{ where}$$

$HES_{-240:16:240}$ indicates a frequency-domain sequence of the 40-MHz HE-STF.

A 0.8-μs HE-STF with a channel bandwidth of 80 MHz has 1024 tones in total, and a subscript ranges from −511 to 512. $HES_{-496:16:496}$ may be expressed by using the following formula:

$$HES_{-496:16:496} = \{M, 1, -M, 0, -M, 1, -M\} \cdot (1+j)/\sqrt{2},$$
where $HES_{-496:16:496}$ indicates a frequency-domain sequence of the 80-MHz HE-STF.

A 0.8-μs HE-STF with a channel bandwidth of 160 MHz has 2048 tones in total, and a subscript ranges from −1023 to 1024. $HES_{-1008:16:1008}$ may be expressed by using the following formula:

$$HES_{-1008:16:1008} = \{M, 1, -M, 0, -M, 1, -M, 0, -M, -1, M, 0, -M, 1, -M\} \cdot (1+j)/\sqrt{2}, \text{ where}$$

$HES_{-1008:16:1008}$ indicates a frequency-domain sequence of the 160-MHz HE-STF.

Case 2: frequency-domain sequence of a 1.6-μs HE-STF

A 1.6-μs HE-STF with a channel bandwidth of 20 MHz has 256 tones in total, and a subscript ranges from −127 to 128. $HES_{-112:8:112}$ may be expressed by using the following formula:

$$HES_{-112:8:112} = \{M, 0, -M\} \cdot (1+j)/\sqrt{2}, \text{ where } HES_0 = 0,$$
and frequency-domain values of other tones are 0; and similar to that in the case 1:

$HES_{-112:8:112}$ indicates a frequency-domain sequence of the 20-MHz HE-STF, specifically, frequency-domain values of tones with subscripts of −112, −104, −96, −88, −80, −72, −64, −56, −48, −40, −32, −24, −16, −8, 0, 8, 16, 24, 32, 40, 48, 56, 64, 72, 80, 88, 96, 104, and 112; and the other tones are tones with remaining subscripts, within the subscript range from −127 to 128, other than the tones with the subscripts of −112, −104, −96, −88, −80, −72, −64, −56, −48, −40, −32, −24, −16, −8, 0, 8, 16, 24, 32, 40, 48, 56, 64, 72, 80, 88, 96, 104, and 112.

The foregoing formula is expanded as follows:

$$HES_{-112:8:112} = \{-(1+j)/\sqrt{2}, -(1+j)/\sqrt{2}, -(1+j)/\sqrt{2}, (1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, (1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, (1+j)/\sqrt{2}, 0, (1+j)/\sqrt{2}, (1+j)/\sqrt{2}, (1+j)/\sqrt{2}, (1+j)/\sqrt{2}, -(1+j)/\sqrt{2}, -(1+j)/\sqrt{2}, -(1+j)/\sqrt{2}, (1+j)/\sqrt{2}, -(1+j)/\sqrt{2}, -(1+j)/\sqrt{2}, -(1+j)/\sqrt{2}, -(1+j)/\sqrt{2}, (1+j)/\sqrt{2}, (1+j)/\sqrt{2}, -(1+j)/\sqrt{2}\}$$

Therefore, the frequency-domain values of the tones with the subscripts of −112, −104, −96, −88, −80, −72, −64, −56, −48, −40, −32, −24, −16, −8, 0, 8, 16, 24, 32, 40, 48, 56, 64, 72, 80, 88, 96, 104, and 112 are as follows: $-(1+j)/\sqrt{2}$, $-(1+j)/\sqrt{2}$, $-(1+j)/\sqrt{2}$, $(1+j)/\sqrt{2}$, $(1+j)/\sqrt{2}$, $(1+j)/\sqrt{2}$, $-(1+j)/\sqrt{2}$, $(1+j)/\sqrt{2}$, $(1+j)/\sqrt{2}$, $(1+j)/\sqrt{2}$, $-(1+j)/\sqrt{2}$, $(1+j)/\sqrt{2}$, $(1+j)/\sqrt{2}$, $(1+j)/\sqrt{2}$, 0, $(1+j)/\sqrt{2}$, $(1+j)/\sqrt{2}$, $(1+j)/\sqrt{2}$, $-(1+j)/\sqrt{2}$, $-(1+j)/\sqrt{2}$, $-(1+j)/\sqrt{2}$, $(1+j)/\sqrt{2}$, $-(1+j)/\sqrt{2}$, $(1+j)/\sqrt{2}$, $-(1+j)/\sqrt{2}$, $-(1+j)/\sqrt{2}$, $(1+j)/\sqrt{2}$, $-(1+j)/\sqrt{2}$, $-(1+j)/\sqrt{2}$, $(1+j)/\sqrt{2}$, and $-(1+j)/\sqrt{2}$ It should be noted that, in this embodiment of this application, expressions similar to $HES_{-112:8:112}$ in formulas have similar meanings. For brevity, details are not described again.

It should be further noted that, in this embodiment of this application, in the following descriptions of formulas, unless otherwise specified, frequency-domain values of tones with other subscripts are all 0. For brevity, details are not described again.

A 1.6-μs HE-STF with a channel bandwidth of 40 MHz has 512 tones in total, and a subscript ranges from −255 to 256. $HES_{-248:8:248}$ may be expressed by using the following formula:

$$HES_{-248:8:248} = \{M,-1,-M,0,M,-1,M\} \cdot (1+j)/\sqrt{2}, \text{ where}$$
$$HES_{1248} = 0; \text{ and}$$

$HES_{-248:8:248}$ indicates a frequency-domain sequence of the 40-MHz HE-STF.

A 1.6-μs HE-STF with a channel bandwidth of 80 MHz has 1024 tones in total, and a subscript ranges from −511 to 512. $HES_{-504:8:504}$ may be expressed by using the following formula:

$$HES_{-504:8:504} = \{M,-1,M,-1,-M,-1,M,0,-M,1,M,1,$$
$$-M,1,-M\} \cdot (1+j)/\sqrt{2}, \text{ where}$$

$HES_{\pm 504} = 0$; and $HES_{-504:8:504}$ indicates a frequency-domain sequence of the 80-MHz HE-STF.

A 1.6-μs HE-STF with a channel bandwidth of 160 MHz has 2048 tones in total, and a subscript ranges from −1023 to 1024. $HES_{-1016:8:1016}$ may be expressed by using the following formula:

$$HES_{-1016:8:1016} = \{M,-1,M,-M,-1,M,0,-M,1,M,1,-M,$$
$$1,-M,0,-M,1,-M,1,M,1,-M,0,-M,1,M,1,-M,1,$$
$$-M\} \cdot (1+j)/\sqrt{2}, \text{ where}$$

$HES_{\pm 8} = 0$, and $HES_{\pm 1016} = 0$; and $HES_{-1016:8:1016}$ indicates a frequency-domain sequence of the 160-MHz HE-STF.

In the foregoing formulas, a geometric meaning of $(1+j)/\sqrt{2}$ on a complex plane is to rotate a value by 450 counterclockwise and keep energy normalized. Similarly, $-(1+j)/\sqrt{2}$ is to rotate a value by 2250 counterclockwise. Therefore, HE-STFs for different channel bandwidths are obtained based on the M-sequence, and it is ensured that an optimized PAPR is achieved. Table 1 lists PAPRs of the foregoing eight HE-STFs.

TABLE 1

| PAPR | 20 MHz | 40 MHz | 80 MHz | 160 MHz |
|---|---|---|---|---|
| 0.8 μs | 1.89 | 4.40 | 4.53 | 5.05 |
| 1.6 μs | 4.40 | 5.22 | 4.79 | 6.34 |

In this embodiment of this application, the rotation factor C and the parameter set A are optimized, to design an EHT-STF for a higher channel bandwidth (for example, the bandwidth of the target channel).

Optionally, the rotation factor C and the parameter set A may be optimized based on the 80-MHz HE-STF, to design the 240-MHz EHT-STF.

Specifically, a channel with a bandwidth of 240 MHz may be constructed by combining three 80-MHz channels. Before a design of an EHT-STF for a channel supporting a bandwidth of 240 MHz is described, a 240-MHz tone plan (tone plan) is first described.

As described above, a tone plan (tone plan) specified in 802.11ax for a channel with a bandwidth of 80 MHz includes 1024 tones in total, a subscript ranges from −511 to 512, and there are 12 guard tones (guard tone) on a left edge of the bandwidth, 11 guard tones on a right edge of the bandwidth, and five direct-current tones in the middle of the bandwidth. The tone plan designed in this application for the channel bandwidth of 240 MHz is obtained by directly combining three existing 80-MHz tone plans, that is, tones on a left edge, tones on a right edge, and direct-current tones in the middle of each of the three 80 MHz are reserved. In this way, the 240-MHz bandwidth has 1024×3=3072 tones in total, and there are 12 guard tones on a left edge, 11 guard tones on a right edge, and five direct-current tones in the middle of the bandwidth.

Therefore, a frequency-domain sequence S is designed for the 240-MHz EHT-STF based on a frequency-domain sequence HES defined in 802.11ax for an 80-MHz HE-STF. As described above, the EHT-STF is obtained by performing IFFT transformation on a frequency-domain sequence of the EHT-STF, the EHT-STF may include a plurality of periods, and duration of each period may be 0.8 μs or 1.6 μs. Therefore, in this embodiment of this application, there may be two periodicities: 0.8 μs or 1.6 μs.

When the periodicity is 0.8 μs, the short training sequence S corresponding to the 240-MHz EHT-STF may be expressed as follows:

$$S_{-520:16:1520} = \{c_1 \cdot L1, a_1, c_2 \cdot R1, a_2, c_3 \cdot L1, 0, c_4 \cdot R1, a_3,$$
$$c_5 \cdot L1, a_4, c_6 \cdot R1\} \cdot (1+j)/\sqrt{2} \quad (1\text{-}1)$$

or
the formula may be expressed as follows:

$$S_{-1520:16:1520} = \{c_1 \cdot HES_{Left\ 1}, a_1, c_2 \cdot HES_{Right\ 1}, a_2,$$
$$c_3 \cdot HES_{Left\ 1}, 0, c_4 \cdot HES_{Right\ 1}, a_3, c_5 \cdot HES_{Left\ 1}, a_4,$$
$$c_6 \cdot HES_{Right\ 1}\} \cdot (1+j)/\sqrt{2} \quad (1\text{-}2)$$

or
when the periodicity is 1.6 μs, the short training sequence S corresponding to the 240-MHz EHT-STF may be expressed as follows:

$$S_{-1528:8:1528} = \{c_1 \cdot L2, a_1, c_2 \cdot R2, a_2, c_3 \cdot L2, 0, c_4 \cdot R2, a_3,$$
$$c_5 \cdot L2, a_4, c_6 \cdot R2\} \cdot (1+j)/\sqrt{2} \quad (1\text{-}3)$$

or
the formula may be expressed as follows:

$$S_{-1528:8:1528} = \{c_1 \cdot HES_{Left\ 2}, a_1, c_2 \cdot HES_{Right\ 2}, a_2,$$
$$c_3 \cdot HES_{Left\ 2}, 0, c_4 \cdot HES_{Right\ 2}, a_3, c_5 \cdot HES_{Left\ 2}, a_4,$$
$$c_6 \cdot HES_{Right\ 2}\} \cdot (1+j)/\sqrt{2} \quad (1\text{-}4)$$

where
a value of $a_i$ is $\{-1, 0, 1\}$, and i=1, 2, 3, 4;
a value of $c_j$ is $\{-1, 1\}$, and j=1, 2, 3, 4, 5, 6;
$S_{-1520:16:1520}$ indicates the frequency-domain sequence of the 240-MHz EHT-STF with the periodicity of 0.8 μs;
$S_{-1528:8:1528}$ indicates the frequency-domain sequence of the 240-MHz EHT-STF with the periodicity of 1.6 μs;
$HES_{Left\ 1}$ is a part of $HES_{-496:16:496}$ on the left of a tone 0, and $HES_{Right\ 1}$ is a part of $HES_{-496:16:496}$ on the right of the tone 0;
$L1 = HES_{Left\ 1} \cdot \sqrt{2}/(1+j)$, and $R1 = HES_{Right\ 1} \cdot \sqrt{2}/(1+j)$;
$HES_{Left\ 2}$ is a part of $HES_{-504:8:504}$ on the left of the tone 0, and $HES_{Right\ 2}$ is a part of $HES_{-504:8:504}$ on the right of the tone 0; and
$L2 = HES_{Left\ 2} \cdot \sqrt{2}/(1+j)$, and $R2 = HES_{Right\ 2} \cdot \sqrt{2}/(1+j)$.

It should be noted that any variation of the foregoing formulas (1-1), (1-2), (1-3), and (1-4) falls within the protection scope of this embodiment of this application. In this embodiment of this application, for brevity, descriptions are provided in a form similar to the formulas (1-1) and (1-3).

Therefore, in the scenario 1, that is, when the periodicity is 0.8 μs, based on the frequency-domain sequence $HES_{-496:16:496}$ defined in 802.11ax for the 80-MHz HE-STF with the periodicity of 0.8 μs, a detailed design formula for the short training sequence corresponding to the 240-MHz EHT-STF with the periodicity of 0.8 μs is as follows:

$$S_{-1520:16:1520} = c_1 \cdot HES_{-496:16:-16}, a_1, c_2 \cdot HES_{16:16:496},$$
$$a_2, c_3 \cdot HES_{-496:16:-16}, 0, c_4 \cdot HES_{16:16:496}, a_3,$$
$$c_5 \cdot HES_{-496:16:-16}, a_4, c_6 \cdot HES_{16:16:496}\} \cdot (1+j)/\sqrt{2} \quad (2\text{-}1)$$

where a value of $a_i$ is {−1, 0, 1}, and i=1, 2, 3, 4;

a value of $c_j$ is {−1, 1}, and j=1, 2, 3, 4, 5, 6;

$S_{-1520:16:1520}$ indicates the frequency-domain sequence of the 240-MHz EHT-STF; and $HES_{-496:16:-16}$ is the part of $HES_{-496:16:496}$ on the left of the tone 0, and $HES_{16:16:496}$ is the part of $HES_{-496:16:496}$ on the right of the tone 0.

For brevity, the foregoing formula may be alternatively designed as follows:

$$S_{-1520:16:1520}=c_1 \cdot L1, a_1, c_2 \cdot R1, a_2, c_3 \cdot L1, 0, c_4 \cdot R1, a_3,\\ c_5 \cdot L1, a_4, c_6 \cdot R1\} \cdot (1+j)/\sqrt{2} \quad (2\text{-}2)$$

where $L1 = HES_{-496:16:-16} \cdot \sqrt{2}/(1+j) = \{M, 1, -M\}$; and $R1 = HES_{16:16:496} \cdot \sqrt{2}/(1+j) = \{-M, 1, -M\}$.

Therefore, when the short training sequence corresponding to the 240-MHz EHT-STF with the periodicity of 0.8 μs is obtained by using the method 1, the short training sequence may be obtained based on the stored $HES_{-496:16:-16}$ and $HES_{16:16:496}$ by using the formula (2-1). Alternatively, when the short training sequence corresponding to the 240-MHz EHT-STF with the periodicity of 0.8 μs is obtained by using the method 2, the short training sequence may be obtained based on the M-sequence by using the formula (2-2).

The short training sequence corresponding to the 240-MHz EHT-STF with the periodicity of 0.8 μs may be obtained based on the formula (2-1) or (2-2). In addition, simulation calculation is performed, for example, $a_i$ and $c_i$ are adjusted, so that a PAPR corresponding to the short training sequence corresponding to the EHT-STF is less than or equal to a preset first threshold, to obtain a sequence with comparatively good performance.

Specifically, inverse Fourier transformation and fivefold over-sampling may be performed on S (that is, $S_{-1520:16:1520}$) to obtain a time-domain discrete value X of each sequence, and then the PAPR is calculated based on the following formula (3):

$$PAPR = 10\log_{10}\left(\frac{\max(X_i^2)}{\text{mean }(X_i^2)}\right) \quad (3)$$

Specifically, after $2^6 \times 3^4 = 5184$ exhaustive searches are performed, all possible $S_{-1520:16:1520}$ and corresponding PAPR values may be obtained, and $S_{-1520:16:1520}$ with a smallest PAPR is finally obtained through comparison. Table 2 shows $a_i$ and $c_i$ in 10 groups of optimal S when the short training sequence S corresponding to the 240-MHz EHT-STF with the periodicity of 0.8 μs is designed based on the short training sequence corresponding to the 80-MHz HE-STF with the periodicity of 0.8 μs.

Setting a preset threshold (for example, the preset first threshold) may be performing exhaustion on the parameter set A and the parameter set C, and performing setting based on a minimum PAPR value (for example, 10 groups of results with minimum PAPRs in Table 2) obtained in an exhaustion process, or may be performing setting comprehensively with reference to a minimum PAPR value obtained in an exhaustion result, a property of a sequence, and the like, or may be performing setting comprehensively with reference to a minimum PAPR value obtained in an exhaustion result, a preset parameter, and the like; or the preset threshold may be specified in advance; or the preset threshold may be obtained based on a plurality of experiment results, or the like.

TABLE 2

Values of parameter sets for the short training sequence S corresponding to the 240-MHz EHT-STF with the periodicity of 0.8 μs

| Sequence number | $a_1$ | $a_2$ | $a_3$ | $a_4$ | $c_1$ | $c_2$ | $c_3$ | $c_4$ | $c_5$ | $c_6$ | PAPR (dB) |
|---|---|---|---|---|---|---|---|---|---|---|---|
| 1 | 1 | 1 | 0 | 0 | 1 | −1 | −1 | 1 | −1 | −1 | 4.8999 |
| 2 | −1 | −1 | 0 | 0 | −1 | 1 | 1 | −1 | 1 | 1 | 4.8999 |
| 3 | 1 | −1 | 1 | 1 | 1 | −1 | −1 | −1 | 1 | 1 | 4.9376 |
| 4 | −1 | 1 | −1 | −1 | −1 | 1 | 1 | 1 | −1 | −1 | 4.9376 |
| 5 | 1 | 1 | 1 | 0 | 1 | −1 | −1 | 1 | −1 | −1 | 4.959 |
| 6 | −1 | −1 | −1 | 0 | −1 | 1 | 1 | −1 | 1 | 1 | 4.959 |
| 7 | 0 | 0 | −1 | 0 | 1 | −1 | −1 | 1 | −1 | −1 | 4.966 |
| 8 | 0 | 0 | 1 | 0 | −1 | 1 | 1 | −1 | 1 | 1 | 4.966 |
| 9 | 1 | 0 | −1 | 0 | 1 | −1 | −1 | 1 | −1 | −1 | 4.9725 |
| 10 | −1 | 0 | 1 | 0 | −1 | 1 | 1 | −1 | 1 | 1 | 4.9725 |

The values of $a_i$ and $c_i$ in the obtained 10 groups of results are separately substituted into the foregoing formula, and it can be learned that the short training sequence corresponding to the 240-MHz EHT-STF with the periodicity of 0.8 μs may be expressed as follows:

{L1, 1, −R1, 1, −L1, 0, R1, 0, −L1, 0, −R1}·(1+j)/√2; or

{−L1, −1, R1, −1, L1, 0, −R1, 0, L1, 0, R1}·(1+j)/√2; or

{L1, 1, −R1, −1, −L1, 0, −R1, 1, L1, 1, R1}·(1+j)/√2; or

{−L1, −1, R1, 1, L1, 0, R1, −1, −L1, −1, −R1}·(1+j)/√2; or

{L1, 1, −R1, 1, −L1, 0, R1, 1, −L1, 0, −R1}·(1+j)/√2; or

{−L1, −1, R1, −1, L1, 0, −R1, −1, L1, 0, R1}·(1+j)/√2; or

{L1, 0, −R1, 0, −L1, 0, R1, −1, −L1, 0, −R1}·(1+j)/√2; or

{−L1, 0, R1, 0, L1, 0, −R1, 1, L1, 0, R1}·(1+j)/√2; or

{L1, 1, −R1, 0, −L1, 0, R1, −1, −L1, 0, −R1}·(1+j)/√2; or

{−L1, −1, R1, 0, L1, 0, −R1, 1, L1, 0, R1}·(1+j)/√2.

L1 expressed as {M, 1, −M}, R1 expressed as {−M, 1, −M}, −L1 expressed as {−M, −1, M}, and −R1 expressed as {M, −1, M} may be substituted to obtain the short training sequence corresponding to the 240-MHz EHT-STF with the periodicity of 0.8 μs.

It should be understood that the short training sequence S corresponding to the EHT-STF with the periodicity of 0.8 μs and the channel bandwidth of 240 MHz may be expressed as any one of the foregoing 10 expressions.

It can be learned from the foregoing that L1 and R1 are sequences related to the short training sequence corresponding to the 80-MHz short training field with the periodicity of 0.8 μs. Therefore, the 240-MHz short training sequence can be compatible with the 80-MHz short training sequence. In addition, the 240-MHz short training sequence can support automatic gain control on a high-bandwidth (the bandwidth is greater than 160 MHz) channel. In addition, it is verified through simulation and comparison between the PAPRs in Table 2 and the PAPRs in 802.11ax (Table 1) that these short training sequences have comparatively small peak-to-average power ratios, and therefore can support automatic gain control on a high-bandwidth channel and can improve an estimation effect for an automatic gain control circuit at a receive end, thereby reducing a receive bit error rate. Therefore, the short training sequence proposed for a high channel bandwidth in this solution of this application can control a PAPR to be very small.

Scenario 2: The Periodicity is 1.6 μs.

Similarly, in this embodiment of this application, a short training sequence S corresponding to a 240-MHz EHT-STF with a periodicity of 1.6 µs may be determined by using at least the following three methods.

The 240-MHz bandwidth has 1024×3=3072 tones in total. There are 12 guard tones on a left edge, 11 guard tones on a right edge, and five direct-current tones in the middle of the bandwidth. In addition, when the periodicity included in the short training field is 1.6 µs, the short training sequence corresponding to the 240-MHz EHT-STF may be expressed as $S_{-1528:8:1528}$, where −1528 indicates a subscript of a starting tone, 1528 indicates a subscript of an ending tone, 8 indicates a spacing, and −1528:8:1528 indicates starting with a tone whose subscript is −1528 and ending with a tone whose subscript is 1528, with a spacing of 8 tones in between. On other tones, a frequency-domain sequence value is 0.

Method 1

Determine, based on a frequency-domain sequence HES for a bandwidth of a reference channel, the short training sequence S corresponding to the 240-MHz EHT-STF with the periodicity of 1.6 µs.

For example, the bandwidth of the reference channel is 80 MHz. Optionally, the short training sequence corresponding to the EHT-STF with the periodicity of 1.6 µs and the target channel bandwidth of 240 MHz may be expressed as follows:

{L2, −1, −R2, −1, L2, 0, R2, 1, −L2, 1, −R2}·(1+j)/√2; or
{−L2, 1, R2, 1, −L2, 0, −R2, −1, L2, −1, R2}·(1+j)/√2; or
{L2, 0, −R2, −1, L2, 0, R2, 1, −L2, 1, −R2}·(1+j)/√2; or
{−L2, 0, R2, 1, −L2, 0, −R2, −1, L2, −1, R2}·(1+j)/√2; or
{L2, −1, −R2, −1, L2, 0, R2, 1, −L2, 0, −R2}·(1+j)/√2; or
{−L2, 1, R2, 1, −L2, 0, −R2, −1, L2, 0, R2}·(1+j)/√2; or
{L2, −1, −R2, −1, L2, 0, R2, 0, −L2, 1, −R2}·(1+j)/√2; or
{−L2, 1, R2, 1, −L2, 0, −R2, 0, L2, −1, R2}·(1+j)/√2; or
{L2, −1, −R2, 0, L2, 0, R2, 1, −L2, 1, −R2}·(1+j)/√2; or
{−L2, 1, R2, 0, −L2, 0, −R2, −1, L2, −1, R2}·(1+j)/√2,
where
$L2 = HES_{-504:8:-8} \cdot \sqrt{2}/(1+j) = \{M, -1, M, -1, -M, -1, M\}$, and $HES_{-504:8:-8}$ is a part of $HES_{-504:8:504}$ on the left of a tone 0;
$R2 = HES_{8:8:504} \cdot \sqrt{2}/(1+j) = \{-M, 1, M, 1, -M, 1, -M\}$, and $HES_{8:8:504}$ is a part of $HES_{-504:8:504}$ on the right of the tone 0;
$HES_{-504:8:504}$ is a frequency-domain sequence corresponding to 80 MHz and the periodicity of 1.6 µs; and
L2 is expressed as {M, −1, M, −1, −M, −1, M}, R2 is expressed as {−M, 1, M, 1, −M, 1, −M}, −L2={−M, 1, −M, 1, M, 1, −M}, and −R2 is expressed as {M, −1, −M, −1, M, −1, M}.

As described above, the short training sequence corresponding to the 240-MHz EHT-STF may be expressed as $S_{-1528:8:1528}$. Therefore, the values given by the foregoing short training sequence each correspond to a frequency-domain sequence value that starts with a tone whose subscript is −1528 and ends with a tone whose subscript is 1528, with a spacing of 8 tones in between.

It should be understood that the short training sequence S corresponding to the EHT-STF with the periodicity of 1.6 µs and the channel bandwidth of 240 MHz may be expressed as any one of the foregoing 10 expressions.

It can be learned from the foregoing that, by using the method 1, the short training sequence corresponding to the 240-MHz EHT-STF with the periodicity of 1.6 µs may be obtained through transformation based on an HES specified in a standard.

Method 2

Obtain, through transformation based on an M-sequence, the short training sequence S corresponding to the 240-MHz EHT-STF with the periodicity of 1.6 µs.

Specifically, L2 expressed as {M, −1, M, −1, −M, −1, M}, R2 expressed as {−M, 1, M, 1, −M, 1, −M}, −L2={−M, 1, −M, 1, M, 1, −M}, and −R2 expressed as {M, −1, −M, −1, M, −1, M} are substituted, and it can be learned that the short training sequence corresponding to the 240-MHz EHT-STF with the periodicity of 1.6 µs may be expressed as follows:

{M, −1, M, −1, −M, −1, M, −1, M, −1, −M, −1, M, −1, M, −1, M, −1, M, −1, −M, −1, M, 0, −M, 1, M, 1, −M, 1, −M, 1, −M, 1, −M, 1, M, 1, −M, 1, M, −1, −M, −1, M, −1, M}·(1+j)/√2; or

{−M, 1, M, 1, −M, 1, −M, 1, −M, 1, −M, 1, −M, 1, −M, 1, M, 1, −M, 0, M, −1, −M, −1, M, −1, M, −1, M, −1, M, −1, −M, −1, M, −1, −M, 1, M, 1, −M, 1, −M}·(1+j)/√2; or

{M, −1, M, −1, −M, −1, M, 0, M, −1, −M, −1, M, −1, M, −1, M, −1, −M, −1, M, 0, −M, 1, M, 1, −M, 1, −M, 1, −M, 1, −M, 1, M, 1, −M, 1, M, −1, −M, −1, M, −1, M}·(1+j)/√2; or

{−M, 1, −M, 1, M, 1, −M, 0, −M, 1, M, 1, −M, 1, −M, 1, −M, 1, −M, 1, M, 1, −M, 0, M, −1, −M, −1, M, −1, M, −1, M, −1, M, −1, −M, −1, M, −1, −M, 1, M, 1, −M, 1, −M}·(1+j)/√2; or

{M, −1, M, −1, −M, −1, M, −1, M, −1, −M, −1, M, −1, M, −1, M, −1, −M, −1, M, 0, −M, 1, M, 1, −M, 1, −M, 1, −M, 1, −M, 1, M, 0, M, −1, −M, −1, M, −1, M}·(1+j)/√2; or

{−M, 1, −M, 1, M, 1, −M, 1, −M, 1, M, 1, −M, 1, −M, 1, M, 1, −M, 0, M, −1, −M, −1, M, −1, M, −1, M, −1, M, −1, −M, −1, M, 0, −M, 1, M, 1, −M, 1, −M}·(1+j)/√2; or

{M, −1, M, −1, −M, −1, M, −1, M, −1, −M, −1, M, −1, M, −1, M, −1, −M, −1, M, 0, −M, 1, M, 1, −M, 1, −M, −M, 1, −M, 1 M, 1, −M, 1, M, −1, −M, −1 M, −1, M}·(1+j)/√2; or

{−M, 1, M, 1, M, 1, −M, 1, −M, 1, −M, 1, −M, 1, −M, 1, M, 1, −M, 0, M, −1, −M, −1, M, −1, M, 0, M, −1, M, −1, −M, −1, M, −1, −M, 1, M, 1, −M, 1, −M}·(1+j)/√2; or

{M, −1, M, −1, −M, −1, M, −1, M, −1, −M, −1, M, −1, M, −1, M, 0, M, −1, M, −1, −M, −1, M, 0, −M, 1, M, 1, −M, 1, −M, 1, −M, 1, −M, 1, M, 1, −M, 1, M, −1, −M, −1, M, −1, M}·(1+j)/√2; or

{−M, 1, −M, 1, M, 1, −M, 1, −M, 1, M, 1, −M, 1, −M, 0, −M, 1, −M, 1, M, 1, −M, 0, M, −1, −M, −1, M, −1, M, −1, M, −1, M, −1, −M, −1, M, −1, −M, 1, M, 1, −M, 1, −M}·(1+j)/√2.

As described above, the short training sequence corresponding to the 240-MHz EHT-STF may be expressed as $S_{-1528:8:1528}$. Therefore, the values given by the foregoing short training sequence each correspond to a frequency-domain sequence value that starts with a tone whose subscript is −1528 and ends with a tone whose subscript is 1528, with a spacing of 8 tones in between.

It should be understood that the short training sequence S corresponding to the EHT-STF with the periodicity of 1.6 µs and the channel bandwidth of 240 MHz may be expressed as any one of the foregoing 10 expressions.

It can be learned from the foregoing that, by using the method 2, the short training sequence corresponding to the 240-MHz EHT-STF with the periodicity of 1.6 µs may be obtained through transformation based on the M-sequence.

Method 3

The short training sequence corresponding to the EHT-STF in the foregoing method 1 or method 2 is directly cached or stored locally. When the short training sequence corresponding to the EHT-STF is to be used, the short training sequence corresponding to the EHT-STF is directly obtained locally.

It should be understood that the foregoing three methods are merely examples for description, and this application is not limited thereto. Any method that can be used to obtain the short training sequence corresponding to the 240-MHz EHT-STF with the periodicity of 1.6 μs falls within the protection scope of this embodiment of this application.

Similar to that in the scenario 1, the short training sequence corresponding to the 240-MHz EHT-STF with the periodicity of 1.6 μs may be obtained through simulation calculation. For example, if the method 1 is used, the short training sequence corresponding to the 240-MHz EHT-STF with the periodicity of 1.6 μs may be obtained through calculation based on a stored short training sequence that corresponds to an HE-STF and by using a corresponding formula. For another example, if the method 2 is used, the short training sequence corresponding to the 240-MHz EHT-STF with the periodicity of 1.6 μs may be obtained through calculation based on a stored or protocol-specified M-sequence by using a corresponding formula.

Specifically, the foregoing 10 sequences may be alternatively designed based on a frequency-domain sequence $HES_{-504:8:504}$ defined in 802.11ax for an 80-MHz HE-STF with a periodicity of 1.6 μs. A detailed design formula is as follows:

$$S_{1528:8:1528} = \{c_1 \cdot L2, a_1, c_2 \cdot R2, a_2, c_3 \cdot L2, 0, c_4 \cdot R2, a_3, c_5 \cdot L2, a_4, c_6 \cdot R2\} \cdot (1+j)/\sqrt{2} \quad (4)$$

where
$L2 = HES_{-504:8:-8} \cdot \sqrt{2}/(1+j) = \{M, -1, M, -1, -M, -1, M\}$;
$R2 = HES_{8:8:504} \cdot \sqrt{2}/(1+j) = \{-M, 1, M, 1, -M, 1, -M\}$;
$S_{\pm 1528} = 0$; and
similarly,
a value of $a_i$ is $\{-1, 0, 1\}$, and i=1, 2, 3, 4; and
a value of $c_j$ is $\{-1, 1\}$, and j=1, 2, 3, 4, 5, 6.

Similarly, when the short training sequence corresponding to the 240-MHz EHT-STF with the periodicity of 1.6 μs is obtained by using the method 1, the short training sequence may be obtained based on the stored $HES_{-504:8:-8}$ and $HES_{8:8:504}$ by using the formula (4). Alternatively, when the short training sequence corresponding to the 240-MHz EHT-STF with the periodicity of 1.6 μs is obtained by using the method 2, the short training sequence may be obtained based on the M-sequence by using the formula (4).

The short training sequence corresponding to the 240-MHz EHT-STF with the periodicity of 1.6 μs may be obtained based on the formula (4). In addition, simulation calculation is performed, for example, $a_i$ and $c_i$ are adjusted, so that a PAPR corresponding to the short training sequence corresponding to the EHT-STF is less than or equal to a preset second threshold, to obtain a sequence with comparatively good performance.

Specifically, after $2^6 \times 3^4 = 5184$ exhaustive searches are performed, all possible $S_{-1528:8:1528}$ and corresponding PAPR values may be obtained, and $S_{-1528:8:1528}$ with a smallest PAPR is finally obtained through comparison. Table 3 shows $a_i$ and $c_i$ in 10 groups of optimal S when the short training sequence of the 240-MHz EHT-STF with the periodicity of 1.6 μs is designed based on the short training sequence corresponding to the 80-MHz and 1.6-μs HE-STF.

Setting a preset threshold (for example, the preset second threshold) may be performing exhaustion on the parameter set A and the parameter set C, and performing setting based on a minimum PAPR value (for example, 10 groups of results with minimum PAPRs in Table 3) obtained in an exhaustion process, or may be performing setting comprehensively with reference to a minimum PAPR value obtained in an exhaustion result, a property of a sequence, and the like, or may be performing setting comprehensively with reference to a minimum PAPR value obtained in an exhaustion result, a preset parameter, and the like; or the preset threshold may be specified in advance; or the preset threshold may be obtained based on a plurality of experiment results, or the like.

TABLE 3

Values of parameter sets for the short training sequence S corresponding to the 240-MHz EHT-STF with the periodicity of 1.6 μs

| Sequence number | $a_1$ | $a_2$ | $a_3$ | $a_4$ | $c_1$ | $c_2$ | $c_3$ | $c_4$ | $c_5$ | $c_6$ | PAPR (dB) |
|---|---|---|---|---|---|---|---|---|---|---|---|
| 1 | −1 | −1 | 1 | 1 | 1 | −1 | 1 | 1 | −1 | −1 | 6.6498 |
| 2 | 1 | 1 | −1 | −1 | −1 | 1 | −1 | −1 | 1 | 1 | 6.6498 |
| 3 | 0 | −1 | 1 | 1 | 1 | −1 | 1 | 1 | −1 | −1 | 6.6997 |
| 4 | 0 | 1 | −1 | −1 | −1 | 1 | −1 | −1 | 1 | 1 | 6.6997 |
| 5 | −1 | −1 | 1 | 0 | 1 | −1 | 1 | 1 | −1 | −1 | 6.7272 |
| 6 | 1 | 1 | −1 | 0 | −1 | 1 | 1 | −1 | 1 | 1 | 6.7272 |
| 7 | −1 | −1 | 0 | 1 | 1 | −1 | 1 | 1 | −1 | −1 | 6.7826 |
| 8 | 1 | 1 | 0 | 1 | −1 | 1 | 1 | −1 | 1 | 1 | 6.7826 |
| 9 | −1 | 0 | 1 | 1 | 1 | −1 | 1 | 1 | −1 | −1 | 6.7929 |
| 10 | 1 | 0 | −1 | −1 | −1 | 1 | −1 | −1 | 1 | 1 | 6.7929 |

The values of $a_i$ and $c_i$ in the obtained 10 groups of results are separately substituted into the formula (4), and it can be learned that the short training sequence corresponding to the 240-MHz EHT-STF with the periodicity of 1.6 μs may be expressed as follows:

$\{L2, -1, -R2, -1, L2, 0, R2, 1, -L2, 1, -R2\} \cdot (1+j)/\sqrt{2}$; or
$\{-L2, 1, R2, 1, -L2, 0, -R2, -1, L2, -1, R2\} \cdot (1+j)/\sqrt{2}$; or
$\{L2, 0, -R2, -1, L2, 0, R2, 1, -L2, 1, -R2\} \cdot (1+j)/\sqrt{2}$; or
$\{-L2, 0, R2, 1, -L2, 0, -R2, -1, L2, -1, R2\} \cdot (1+j)/\sqrt{2}$; or
$\{L2, -1, -R2, -1, L2, 0, R2, 1, -L2, 0, -R2\} \cdot (1+j)/\sqrt{2}$; or
$\{-L2, 1, R2, 1, -L2, 0, -R2, -1, L2, 0, R2\} \cdot (1+j)/\sqrt{2}$; or
$\{L2, -1, -R2, -1, L2, 0, R2, 0, -L2, 1, -R2\} \cdot (1+j)/\sqrt{2}$; or
$\{-L2, 1, R2, 1, -L2, 0, -R2, 0, L2, -1, R2\} \cdot (1+j)/\sqrt{2}$; or
$\{L2, -1, -R2, 0, L2, 0, R2, 1, -L2, 1, -R2\} \cdot (1+j)/\sqrt{2}$; or
$\{-L2, 1, R2, 0, -L2, 0, -R2, -1, L2, -1, R2\} \cdot (1+j)/\sqrt{2}$.

L2 expressed as $\{M, -1, M, -1, -M, -1, M\}$, R2 expressed as $\{-M, 1, M, 1, -M, 1, -M\}$, $-L2 = \{-M, 1, -M, 1, M, 1, -M\}$, and $-R2$ expressed as $\{M, -1, -M, -1, M, -1, M\}$ may be substituted to obtain the short training sequence corresponding to the 240-MHz EHT-STF with the periodicity of 1.6 μs.

It should be understood that the short training sequence S corresponding to the EHT-STF with the periodicity of 1.6 μs and the channel bandwidth of 240 MHz may be expressed as any one of the foregoing 10 expressions.

It can be learned from the foregoing that L2 and R2 are sequences related to the 80-MHz and 1.6-μs short training sequence. Therefore, the 240-MHz short training sequence can be compatible with the 80-MHz short training sequence. In addition, the 240-MHz short training sequence can support automatic gain control on a high-bandwidth (the bandwidth is greater than 160 MHz) channel. In addition, it is verified through simulation and comparison between the PAPRs in Table 3 and the PAPRs in 802.11ax (Table 1) that these short training sequences have comparatively small peak-to-average power ratios, and therefore can support automatic gain control on a high-bandwidth channel and can improve an estimation effect for an automatic gain control circuit at a receive end, thereby reducing a receive bit error rate. Therefore, the short training sequence proposed for a high channel bandwidth in this solution of this application can control a PAPR to be very small.

Example 2: The Bandwidth of the Target Channel is 320 MHz

The following describes a short training sequence S corresponding to a 320-MHz EHT-STF still by using a scenario in which the periodicity is 0.8 µs and a scenario in which the periodicity is 1.6 µs Scenario 1: The Periodicity is 0.8 µs.

When the periodicity is 0.8 µs and the bandwidth of the target channel is 320 MHz, different 320-MHz EHT-STFs are obtained based on HE-STFs for reference channels with different bandwidths. The following describes different expressions of the 320-MHz EHT-STF with reference to a manner A and a manner B.

Manner A

Obtain, based on a short training sequence corresponding to an 80-MHz HE-STF with a periodicity of 0.8 µs, a short training sequence S corresponding to a 320-MHz EHT-STF with a periodicity of 0.8 µs.

The 320-MHz bandwidth has 1024×4=4096 tones in total. There are 12 guard tones on a left edge, 11 guard tones on a right edge, and 11+12=23 direct-current tones in the middle of the bandwidth. When the periodicity included in the short training field is 0.8 µs, the short training sequence may be expressed as $S_{-2032:16:2032}$, where −2032 indicates a subscript of a starting tone, 2032 indicates a subscript of an ending tone, 16 indicates a spacing, and −2032:16:2032 indicates starting with a tone whose subscript is −2032 and ending with a tone whose subscript is 2032, with a spacing of 16 tones in between. On other tones, a frequency-domain sequence value is 0.

Similarly, in this embodiment of this application, the short training sequence S corresponding to the 320-MHz EHT-STF with the periodicity of 0.8 µs may be determined by using at least the following three methods.

Method 1

Determine, based on a frequency-domain sequence HES for a reference channel, the short training sequence S corresponding to the 320-MHz EHT-STF with the periodicity of 0.8 µs.

Optionally, the short training sequence S corresponding to the EHT-STF with the periodicity of 0.8 µs and the target channel bandwidth of 320 MHz may be expressed as follows:

{L1, 0, −R1, 0, L1, 0, R1, 0, L1, 0, −R1, −1, −L1, 0, −R1}·(1+j)/√2; or

{−L1, 0, R1, 0, −L1, 0, −R1, 0, −L1, 0, R1, 1, L1, 0, R1}·(1+j)/√2; or

{L1, 0, −R1, −1, L1, 0, R1, 0, L1, 0, −R1, −1, −L1, 0, −R1}·(1+j)/√2; or

{−L1, 0, R1, 1, −L1, 0, −R1, 0, −L1, 0, R1, 1, L1, 0, R1}·(1+j)/√2; or

{L1, 0, −R1, 0, −L1, 0, R1, 0, −L1, 0, R1, −1, −L1, 0, −R1}·(1+j)/√2; or

{−L1, 0, R1, 0, L1, 0, −R1, 0, L1, 0, R1, 1, L1, 0, R1}·(1+j)/√2; or

{L1, 0, −R1, 0, L1, 0, −R1, 0, L1, 0, R1, 0, L1, 0, −R1, 0, −L1, 0, R1, 0, L1, 0, R1, 0, −L1, 0, −R1}·(1+j)/√2; or

{−L1, 0, R1, 0, −L1, 0, R1, 0, L1, 0, R1, 0, −L1, 0, −R1}·(1+j)/√2; or

{L1, 0, −R1, 1, L1, 0, −R1, 0, −L1, 0, −R1, −1, L1, 0, R1}·(1+j)/√2; or

{−L1, 0, R1, −1, −L1, 0, R1, 0, L1, 0, R1, 1, −L1, 0, −R1}·(1+j)/√2, where similarly, $L1 = HES_{Left\_1} \cdot \sqrt{2}/(1+j) = HES_{-496:16:-16} \cdot \sqrt{2}/(1+j)$, and $R1 = HES_{Right\_1} \cdot \sqrt{2}/(1+j) = HES_{16:16:496} \cdot \sqrt{2}/(1+j)$;

$HES_{-496:16:496}$ is an HES corresponding to 80 MHz and the periodicity of 0.8 µs; and L1 is expressed as {M, 1, −M}, R1 is expressed as {−M, 1, −M}, −L1 is expressed as {−M, −1, M}, and −R1 is expressed as {M, −1, M}.

Therefore, the values given by the foregoing short training sequence each correspond to a frequency-domain sequence value that starts with a tone whose subscript is −2032 and ends with a tone whose subscript is 2032, with a spacing of 16 tones in between.

It should be understood that the short training sequence S corresponding to the EHT-STF with the periodicity of 0.8 µs and the channel bandwidth of 320 MHz may be expressed as any one of the foregoing 10 expressions.

It can be learned from the foregoing that, by using the method 1, the short training sequence S corresponding to the 320-MHz EHT-STF with the periodicity of 0.8 µs may be obtained through transformation based on an HES specified in a standard.

Method 2

Obtain, through transformation based on an M-sequence, the short training sequence S corresponding to the 320-MHz EHT-STF with the periodicity of 0.8 µs.

Specifically, L1 expressed as {M, 1, −M}, R1 expressed as {−M, 1, −M}, −L1 expressed as {−M, −1, M}, and −R1 expressed as {M, −1, M} are substituted, and it can be learned that the short training sequence S corresponding to the 320-MHz EHT-STF with the periodicity of 0.8 µs may be expressed as follows:

{M, 1, −M, 0, M, −1, M, 0, M, 1, −M, 0, −M, 1, −M, 0, M, 1, −M, 0, M, −1, M, −1, −M, −1, M, 0, M, −1, M}·(1+j)/√2; or

{−M, −1, M, 0, −M, 1, −M, 0, −M, −1, M, 0, −M, 1, M, 0, −M, −1, M, 0, −M, 1, −M, 1, M, 1, −M, 0, −M, 1, −M}·(1+j)/√2; or

{M, 1, −M, 0, M, −1, M, −1, M, 1, −M, 0, −M, 1, −M, 0, M, 1, −M, 0, M, −1, M, −1, −M, −1, M, 0, M, −1, M}·(1+j)/√2; or

{−M, −1, M, 0, −M, 1, −M, 1, −M, −1, M, 0, M, −1, M, 0, −M, −1, M, 0, −M, 1, −M, 1, M, 1, −M, 0, −M, 1, −M}·(1+j)/√2; or

{M, 1, −M, 0, M, −1, M, 0, M, −1, M, 0, −M, 1, −M, 0, −M, −1, M, 0, M, −1, M, −1, −M, −1, M, 0, M, −1, M}·(1+j)/√2; or

{−M, −1, M, 0, −M, 1, −M, 0, M, 1, −M, 0, M, −1, M, 0, M, 1, −M, 0, −M, 1, M, 1, −M, 0, −M, 1, −M}·(1+j)/√2; or

{M, 1, −M, 0, M, −1, M, 0, M, 1, −M, 0, M, 0, −M, −1, M, 0, M, −1, M, 0, M, 1, −M, 0, −M, 1, −M}·(1+j)/√2; or

{−M, −1, M, 0, −M, 1, −M, 0, −M, −1, M, 0, −M, 1, −M, 0, M, 1, −M, 0, −M, 1, −M, 0, −M, −1, M, 0, M, −1, M}·(1+j)/√2; or

{M, 1, −M, 0, M, −1, M, 1, M, 1, −M, 0, M, −1, M, 0, −M, −1, M, 0, M, −1, M, −1, M, 1, −M, 0, −M, 1, −M}·(1+j)/√2; or

{−M, −1, M, 0, −M, 1, −M, −1, −M, −1, M, 0, −M, 1, −M, 0, M, 1, −M, 0, −M, 1, −M, 1, −M, −1, M, 0, M, −1, M}·(1+j)/√2.

Therefore, the values given by the foregoing short training sequence each correspond to a frequency-domain sequence value that starts with a tone whose subscript is −2032 and ends with a tone whose subscript is 2032, with a spacing of 16 tones in between.

It should be understood that the short training sequence S corresponding to the EHT-STF with the periodicity of 0.8 μs and the channel bandwidth of 320 MHz may be expressed as any one of the foregoing 10 expressions.

It can be learned from the foregoing that, by using the method 2, the short training sequence S corresponding to the 320-MHz EHT-STF with the periodicity of 0.8 μs may be obtained through transformation based on the M-sequence.

Method 3

The short training sequence corresponding to the EHT-STF in the foregoing method 1 or method 2 is directly cached or stored locally. When the short training sequence corresponding to the EHT-STF is to be used, the short training sequence corresponding to the EHT-STF is directly obtained locally.

It should be understood that the foregoing three methods are merely examples for description, and this application is not limited thereto. Any method that can be used to obtain the short training sequence corresponding to the 320-MHz EHT-STF with the periodicity of 0.8 μs falls within the protection scope of this embodiment of this application.

The short training sequence corresponding to the 320-MHz EHT-STF with the periodicity of 0.8 μs may be obtained through simulation calculation. For example, if the method 1 is used, the short training sequence corresponding to the 320-MHz EHT-STF with the periodicity of 0.8 μs may be obtained through calculation based on a stored frequency-domain sequence HES that corresponds to an HE-STF and by using a corresponding formula. For another example, if the method 2 is used, the short training sequence corresponding to the 320-MHz EHT-STF with the periodicity of 0.8 μs may be obtained through calculation based on a stored or protocol-specified M-sequence by using a corresponding formula.

Specifically, similar to the design of the EHT-STF for the channel bandwidth of 240 MHz, in this solution of this application, for the channel bandwidth of 320 MHz, the EHT-STF for a channel with a bandwidth of 320 MHz is designed based on the HE-STF for a channel with a bandwidth of 80 MHz. First, a tone plan for the bandwidth of 320 MHz is obtained by combining four tone plans with a bandwidth of 80 MHz each. Similar to 240 MHz, guard tones on the left and right and direct-current tones in the middle of each 80 MHz are reserved. In this way, the 320-MHz bandwidth has 1024×4=4096 tones in total, and there are 12 guard tones on a left edge, 11 guard tones on a right edge, and 11+12=23 direct-current tones in the middle of the bandwidth.

Based on the frequency-domain sequence $HES_{-496:16:496}$ defined in 802.11ax for the 80-MHz HE-STF with the periodicity of 0.8 μs, a detailed design formula for the short training sequence S corresponding to the 320-MHz EHT-STF with the periodicity of 0.8 μs is as follows:

$$S_{-2032:16:2032}=\{c_1 \cdot L1, 0, c_2 \cdot R1, a_1, c_3 \cdot L1, 0, c_4 \cdot R1, 0, c_5 \cdot L1, 0, c_6 \cdot R1, a_2, c_7 \cdot L1, 0, c_8 \cdot R1\} \cdot (1+j)/\sqrt{2} \quad (5)$$

where $L1=HES_{-496:16:-16} \cdot \sqrt{2}/(1+j)=\{M, 1, -M\}$;
$R1=HES_{16:16:496} \cdot \sqrt{2}/(1+j)=\{-M, 1, -M\}$; and
similarly,
a value of $a_i$ is $\{-1, 0, 1\}$, and i=1, 2; and
a value of $c_j$ is $\{-1, 1\}$, and j=1, 2, 3, 4, 5, 6, 7, 8.

Therefore, when the short training sequence corresponding to the 320-MHz EHT-STF with the periodicity of 0.8 μs is obtained by using the method 1, the short training sequence may be obtained based on the stored $HES_{-496:16:-16}$ and $HES_{16:16:496}$ by using the formula (5). Alternatively, when the short training sequence corresponding to the 320-MHz EHT-STF with the periodicity of 0.8 μs is obtained by using the method 2, the short training sequence may be obtained based on the M-sequence by using the formula (5).

The short training sequence corresponding to the 320-MHz EHT-STF with the periodicity of 0.8 μs may be obtained based on the formula (5). In addition, simulation calculation is performed, for example, $a_i$ and $c_i$ are adjusted, so that a PAPR corresponding to the short training sequence corresponding to the EHT-STF is less than or equal to a preset third threshold, to obtain a sequence with comparatively good performance.

Specifically, after $2^8 \times 3^2 = 2304$ exhaustive searches are performed, all possible $S_{-2032:16:2032}$ and corresponding PAPR values may be obtained, and $S_{-2032:16:2032}$ with a smallest PAPR is finally obtained through comparison. Table 4 shows $a_i$ and $c_i$ in 10 groups of optimal S when the short training sequence S corresponding to the 320-MHz EHT-STF with the periodicity of 0.8 μs is designed based on the frequency-domain sequence HES of the 80-MHz HE-STF with the periodicity of 0.8 μs.

Setting a preset threshold (for example, the preset third threshold) may be performing exhaustion on the parameter set A and the parameter set C, and performing setting based on a minimum PAPR value (for example, 10 groups of results with minimum PAPRs in Table 4) obtained in an exhaustion process, or may be performing setting comprehensively with reference to a minimum PAPR value obtained in an exhaustion result, a property of a sequence, and the like, or may be performing setting comprehensively with reference to a minimum PAPR value obtained in an exhaustion result, a preset parameter, and the like; or the preset threshold may be specified in advance; or the preset threshold may be obtained based on a plurality of experiment results, or the like.

TABLE 4

Values of parameter sets for the short training sequence S corresponding to the 320-MHz EHT-STF with the periodicity of 0.8 μs

| Sequence number | $a_1$ | $a_2$ | $c_1$ | $c_2$ | $c_3$ | $c_4$ | $c_5$ | $c_6$ | $c_7$ | $c_8$ | PAPR (dB) |
|---|---|---|---|---|---|---|---|---|---|---|---|
| 1 | 0 | −1 | 1 | −1 | 1 | 1 | 1 | −1 | −1 | −1 | 4.7164 |
| 2 | 0 | 1 | −1 | 1 | −1 | −1 | 1 | 1 | 1 | 1 | 4.7164 |
| 3 | −1 | −1 | 1 | −1 | 1 | 1 | 1 | −1 | −1 | −1 | 4.7482 |
| 4 | 1 | 1 | −1 | 1 | −1 | −1 | −1 | 1 | 1 | 1 | 4.7482 |
| 5 | 0 | −1 | 1 | −1 | −1 | 1 | −1 | −1 | −1 | −1 | 4.8001 |
| 6 | 0 | 1 | −1 | 1 | 1 | −1 | 1 | 1 | 1 | 1 | 4.8001 |
| 7 | 0 | 0 | 1 | −1 | 1 | −1 | −1 | −1 | 1 | 1 | 4.8576 |
| 8 | 0 | 0 | −1 | 1 | −1 | 1 | 1 | 1 | −1 | −1 | 4.8576 |
| 9 | 1 | −1 | 1 | −1 | 1 | −1 | −1 | −1 | 1 | 1 | 4.8615 |
| 10 | −1 | 1 | −1 | 1 | −1 | 1 | 1 | 1 | −1 | −1 | 4.8615 |

The values of $a_i$ and $c_i$ in the obtained 10 groups of results are separately substituted into the formula (5), and it can be learned that the short training sequence corresponding to the 320-MHz EHT-STF with the periodicity of 0.8 μs may be expressed as follows:

{L1, 0, −R1, 0, L1, 0, R1, 0, L1, 0, −R1, −1, −L1, 0, −R1}·(1+j)/√2; or

{−L1, 0, R1, 0, −L1, 0, −R1, 0, −L1, 0, R1, 1, L1, 0, R1}·(1+j)/√2; or

{L1, 0, −R1, −1, L1, 0, R1, 0, L1, 0, −R1, −1, −L1, 0, −R1}·(1+j)/√2; or

{−L1, 0, R1, 1, −L1, 0, −R1, 0, −L1, 0, R1, 1, L1, 0, R1}·(1+j)/√2; or

{L1, 0, −R1, 0, −L1, 0, R1, 0, −L1, 0, −R1, −1, −L1, 0, −R1}·(1+j)/√2; or

{−L1, 0, R1, 0, L1, 0, −R1, 0, L1, 0, R1, 1, L1, 0, R1}·(1+j)/√2; or

{L1, 0, −R1, 0, L1, 0, −R1, 0, −L1, 0, −R1, 0, L1, 0, R1}·(1+j)/√2; or

{−L1, 0, R1, 0, −L1, 0, R1, 0, L1, 0, R1, 0, −L1, 0, −R1}·(1+j)/√2; or

{L1, 0, −R1, 1, L1, 0, −R1, 0, −L1, 0, −R1, −1, L1, 0, R1}·(1+j)/√2; or

{−L1, 0, R1, −1, −L1, 0, R1, 0, L1, 0, R1, 1, −L1, 0, −R1}·(1+j)/√2.

L1 expressed as {M, 1, −M}, R1 expressed as {−M, 1, −M}, −L1 expressed as {−M, −1, M}, and −R1 expressed as {M, −1, M} may be substituted to obtain the short training sequence corresponding to the 320-MHz EHT-STF with the periodicity of 0.8 μs.

It should be understood that the short training sequence S corresponding to the EHT-STF with the periodicity of 0.8 μs and the channel bandwidth of 320 MHz may be expressed as any one of the foregoing 10 expressions.

It can be learned from the foregoing that L1 and R1 are sequences related to the short training sequence corresponding to 80 MHz and the periodicity of 0.8 μs. Therefore, the 320-MHz short training sequence can be compatible with the 80-MHz short training sequence. In addition, the 320-MHz short training sequence can support automatic gain control on a high-bandwidth (the bandwidth is greater than 160 MHz) channel. In addition, it is verified through simulation and comparison between the PAPRs in Table 4 and the PAPRs in 802.11ax (Table 1) that these short training sequences have comparatively small peak-to-average power ratios, and therefore can support automatic gain control on a high-bandwidth channel and can improve an estimation effect for an automatic gain control circuit at a receive end, thereby reducing a receive bit error rate. Therefore, the short training sequence proposed for a high channel bandwidth in this solution of this application can control a PAPR to be very small.

Manner B

Obtain, based on a 160-MHz frequency-domain sequence HES with a periodicity of 0.8 μs, a short training sequence S corresponding to a 320-MHz EHT-STF with a periodicity of 0.8 μs.

The 320-MHz bandwidth has 2048×2=4096 tones in total. When the periodicity included in the short training field is 0.8 μs, the short training sequence may be expressed as $S_{-2032:16:2032}$, where −2032 indicates a subscript of a starting tone, 2032 indicates a subscript of an ending tone, 16 indicates a spacing, and −2032:16:2032 indicates starting with a tone whose subscript is −2032 and ending with a tone whose subscript is 2032, with a spacing of 16 tones in between. On other tones, a frequency-domain sequence value is 0.

Similarly, in this embodiment of this application, the short training sequence corresponding to the 320-MHz EHT-STF with the periodicity of 0.8 μs may be determined by using at least the following three methods.

Method 1

Determine, based on a frequency-domain sequence HES for a bandwidth of a reference channel, the short training sequence S corresponding to the 320-MHz EHT-STF with the periodicity of 0.8 μs.

Optionally, the short training sequence corresponding to the EHT-STF with the periodicity of 0.8 μs and the target channel bandwidth of 320 MHz may be expressed as follows:

{L3, 0, R3, 0, −L3, −1, R3}·(1+j)/√2; or
{−L3, 0, −R3, 0, L3, 1, −R3}·(1+j)/√2; or
{L3, 0, R3, 0, −L3, 0, R3}·(1+j)/√2; or
{−L3, 0, −R3, 0, L3, 0, −R3}·(1+j)/√2; or
{L3, 1, −R3, 0, −L3, 1, −R3}·(1+j)/√2; or
{−L3, −1, R3, 0, L3, −1, R3}·(1+j)/√2; or
{L3, 1, −R3, 0, −L3, 0, −R3}·(1+j)/√2; or
{−L3, −1, R3, 0, L3, 0, R3}·(1+j)/√2; or
{L3, 1, R3, 0, −L3, −1, R3}·(1+j)/√2; or
{−L3, −1, −R3, 0, L3, 1, −R3}·(1+j)/√2, where similarly, L3=$HES_{-108:16}$·√2/(1+j)={M, 1, −M, 0, −M, 1, −M}, and $HES_{-108:16:-16}$ is a part of $HES_{-1008:16:1008}$ on the left of a tone 0;

R3=$HES_{16:16:1008}$·√2/(1+j)={−M, −1, M, 0, −M, 1, −M}, and $HES_{16:16:1008}$ is a part of $HES_{-1008:16:1008}$ on the right of the tone 0; and $HES_{-1008:16:1008}$ is an HES corresponding to 160 MHz and the periodicity of 0.8 μs.

Therefore, the values given by the foregoing short training sequence each correspond to a frequency-domain sequence value that starts with a tone whose subscript is −2032 and ends with a tone whose subscript is 2032, with a spacing of 16 tones in between.

It should be understood that the short training sequence S corresponding to the EHT-STF with the periodicity of 0.8 μs and the channel bandwidth of 320 MHz may be expressed as any one of the foregoing 10 expressions.

It can be learned from the foregoing that, by using the method 1, the short training sequence corresponding to the 320-MHz EHT-STF with the periodicity of 0.8 μs may be obtained through transformation based on an HES specified in a standard.

Method 2

Obtain, through transformation based on an M-sequence, the short training sequence S corresponding to the 320-MHz EHT-STF with the periodicity of 0.8 μs.

Specifically, L3 expressed as {M, 1, −M, 0, −M, 1, −M}, R3 expressed as {−M, −1, M, 0, −M, 1, −M}, −L3 expressed as {−M, −1, M, 0, M, −1, M}, and −R3 expressed as {M, 1, −M, 0, M, −1, M} are substituted, and it can be learned that the short training sequence corresponding to the 320-MHz EHT-STF with the periodicity of 0.8 μs may be expressed as follows:

{M, 1, −M, 0, −M, 1, −M, 0, −M, −1, M, 0, −M, 1, −M, 0, −M, −1, M, 0, M, −1, M, −1, −M, −1, M, 0, −M, 1, −M}·(1+j)/√2; or

{−M, −1, M, 0, M, −1, M, 0, M, 1, −M, 0, M, −1, M, 0, M, 1, −M, 0, −M, 1, −M, 1, M, 1, −M, 0, M, −1, M}·(1+j)/√2; or

{M, 1, −M, 0, −M, 1, −M, 0, −M, −1, M, 0, −M, 1, −M, 0, −M, −1, M, 0, M, −1, M, 0, −M, −1, M, 0, −M, 1, −M}·(1+j)/√2; or

{−M, −1, M, 0, M, −1, M, 0, M, 1, −M, 0, M, −1, M, 0, M, 1, −M, 0, −M, 1, −M, 0, M, 1, −M, 0, M, −1, M}·(1+j)/√2; or

{M, 1, −M, 0, −M, 1, −M, 1, M, 1, −M, 0, M, −1, M, 0, −M, −1, M, 0, M, −1, M, 1, M, 1, −M, 0, M, −1, M}·(1+j)/√2; or

{−M, −1, M, 0, M, −1, M, −1, −M, −1, M, 0, −M, 1, −M, 0, M, 1, −M, 0, −M, 1, −M, −1, −M, −1, M, 0, −M, 1, −M}·(1+j)/√2; or

{M, 1, −M, 0, −M, 1, −M, 1, M, 1, −M, 0, M, −1, M, 0, −M, −1, M, 0, M, −1, M, 0, M, 1, −M, 0, M, −1, M}·(1+j)/√2; or

{−M, −1, M, 0, M, −1, M, −1, −M, −1, M, 0, −M, 1, −M, 0, M, 1, −M, 0, −M, 1, −M, 0, −M, −1, M, 0, −M, 1, −M}·(1+j)/√2; or

{M, 1, −M, 0, −M, 1, −M, 1, −M, −1, M, 0, −M, 1, −M, 0, −M, −1, M, 0, M, −1, M, −1, −M, −1, M, 0, −M, 1, −M}·(1+j)/√2; or

{−M, −1, M, 0, M, −1, M, −1, M, 1, −M, 0, M, −1, M, 0, M, 1, −M, 0, −M, 1, −M, 1, M, 1, −M, 0, M, −1, M}·(1+j)/√2.

Therefore, the values given by the foregoing short training sequence each correspond to a frequency-domain sequence value that starts with a tone whose subscript is −2032 and ends with a tone whose subscript is 2032, with a spacing of 16 tones in between.

It should be understood that the short training sequence S corresponding to the EHT-STF with the periodicity of 0.8 μs and the channel bandwidth of 320 MHz may be expressed as any one of the foregoing 10 expressions.

It can be learned from the foregoing that, by using the method 2, the short training sequence S corresponding to the 320-MHz EHT-STF with the periodicity of 0.8 μs may be obtained through transformation based on the M-sequence.

Method 3

The short training sequence corresponding to the EHT-STF in the foregoing method 1 or method 2 is directly cached or stored locally. When the short training sequence corresponding to the EHT-STF is to be used, the short training sequence corresponding to the EHT-STF is directly obtained locally.

It should be understood that the foregoing three methods are merely examples for description, and this application is not limited thereto. Any method that can be used to obtain the short training sequence corresponding to the 320-MHz EHT-STF with the periodicity of 0.8 μs falls within the protection scope of this embodiment of this application.

Similar to that in the scenario 1, the short training sequence S corresponding to the 320-MHz EHT-STF with the periodicity of 0.8 μs may be obtained through simulation calculation. For example, if the method 1 is used, the short training sequence S corresponding to the 320-MHz EHT-STF with the periodicity of 0.8 μs may be obtained through calculation based on a stored frequency-domain sequence HES that corresponds to an HE-STF and by using a corresponding formula. For another example, if the method 2 is used, the short training sequence S corresponding to the 320-MHz EHT-STF with the periodicity of 0.8 μs may be obtained through calculation based on a stored or protocol-specified M-sequence by using a corresponding formula.

Specifically, the EHT-STF with the bandwidth of 320 MHz may be alternatively constructed by rotating and combining HE-STFs with a bandwidth of 160 MHz. Specifically, the short training sequence S corresponding to the 320-MHz EHT-STF with the periodicity of 0.8 μs may be designed based on the frequency-domain sequence $HES_{-1008:16:1008}$ defined in 802.11ax for the 160-MHz HE-STF with the periodicity of 0.8 μs. A detailed design formula thereof is as follows:

$$S_{-2032:16:2032} = \{c_1 \cdot L3, a_1, c_2 \cdot R3, 0, c_3 \cdot L3, a_2, c_4 \cdot R3\} \cdot (1+j)/\sqrt{2} \quad (6)$$

where
$L3 = HES_{-1008:16:-16} \cdot \sqrt{2}/(1+j) = \{M, 1, -M, 0, -M, 1, -M\}$;
$R3 = HES_{16:16:1008} \cdot \sqrt{2}/(1+j) = \{-M, -1, M, 0, -M, 1, -M\}$;
and similarly,
a value of $a_i$ is {−1, 0, 1}, and i=1, 2; and
a value of $c_j$ is {−1, 1}, and j=1, 2, 3, 4.

Similarly, when the short training sequence corresponding to the 320-MHz EHT-STF with the periodicity of 0.8 μs is obtained by using the method 1, the short training sequence may be obtained based on the stored $HES_{-1008:16:-16}$ and $HES_{16:16:1008}$ by using the formula (6). Alternatively, when the short training sequence corresponding to the 320-MHz EHT-STF with the periodicity of 0.8 μs is obtained by using the method 2, the short training sequence may be obtained based on the M-sequence by using the formula (6).

The short training sequence corresponding to the 320-MHz EHT-STF with the periodicity of 0.8 μs may be obtained based on the formula (6). In addition, simulation calculation is performed, for example, $a_i$ and $c_i$ are adjusted, so that a PAPR corresponding to the short training sequence corresponding to the EHT-STF is less than or equal to a preset fourth threshold, to obtain a sequence with comparatively good performance.

Specifically, after $2^4 \times 3^2 = 144$ exhaustive searches are performed, all possible $S_{-2032:16:2032}$ and corresponding PAPR values may be obtained, and $S_{-2032:16:2032}$ with a smallest PAPR is finally obtained through comparison. Table 5 shows $a_i$ and $c_i$ in 10 groups of optimal S when the short training sequence S corresponding to the 320-MHz EHT-STF with the periodicity of 0.8 μs is designed based on the 160-MHz HE-STF with the periodicity of 0.8 μs.

Setting a preset threshold (for example, the preset fourth threshold) may be performing exhaustion on the parameter set A and the parameter set C, and performing setting based on a minimum PAPR value (for example, 10 groups of results with minimum PAPRs in Table 5) obtained in an exhaustion process, or may be performing setting comprehensively with reference to a minimum PAPR value obtained in an exhaustion result, a property of a sequence, and the like, or may be performing setting comprehensively with reference to a minimum PAPR value obtained in an exhaustion result, a preset parameter, and the like; or the preset threshold may be specified in advance; or the preset threshold may be obtained based on a plurality of experiment results, or the like.

TABLE 5

Values of parameter sets for the short training sequence S corresponding to the 320-MHz EHT-STF with the periodicity of 0.8 μs

| Sequence number | $a_1$ | $a_2$ | $c_1$ | $c_2$ | $c_3$ | $c_4$ | PAPR (dB) |
|---|---|---|---|---|---|---|---|
| 1 | 0 | −1 | 1 | 1 | −1 | 1 | 5.2021 |
| 2 | 0 | 1 | −1 | −1 | 1 | −1 | 5.2021 |
| 3 | 0 | 0 | 1 | 1 | −1 | 1 | 5.2404 |
| 4 | 0 | 0 | −1 | −1 | 1 | −1 | 5.2404 |
| 5 | 1 | 1 | 1 | −1 | −1 | −1 | 5.2691 |
| 6 | −1 | −1 | −1 | 1 | 1 | 1 | 5.2691 |
| 7 | 1 | 0 | 1 | −1 | −1 | −1 | 5.3267 |
| 8 | −1 | 0 | −1 | 1 | 1 | 1 | 5.3267 |
| 9 | 1 | −1 | 1 | 1 | −1 | 1 | 5.3441 |
| 10 | −1 | 1 | −1 | −1 | 1 | −1 | 5.3441 |

The values of $a_i$ and $c_i$ in the obtained 10 groups of results are separately substituted into the formula (6), and it can be learned that the short training sequence S corresponding to the 320-MHz EHT-STF with the periodicity of 0.8 μs may be expressed as follows:

$\{L3, 0, R3, 0, -L3, -1, R3\}\cdot(1+j)/\sqrt{2}$; or
$\{-L3, 0, -R3, 0, L3, 1, -R3\}\cdot(1+j)/\sqrt{2}$; or
$\{L3, 0, R3, 0, -L3, 0, R3\}\cdot(1+j)/\sqrt{2}$; or
$\{-L3, 0, -R3, 0, L3, 0, -R3\}\cdot(1+j)/\sqrt{2}$; or
$\{L3, 1, -R3, 0, -L3, 1, -R3\}\cdot(1+j)/\sqrt{2}$; or
$\{-L3, -1, R3, 0, L3, -1, R3\}\cdot(1+j)/\sqrt{2}$; or
$\{L3, 1, -R3, 0, -L3, 0, -R3\}\cdot(1+j)/\sqrt{2}$; or
$\{-L3, -1, R3, 0, L3, 0, R3\}\cdot(1+j)/\sqrt{2}$; or
$\{L3, 1, R3, 0, -L3, -1, R3\}\cdot(1+j)/\sqrt{2}$; or
$\{-L3, -1, -R3, 0, L3, 1, -R3\}\cdot(1+j)/\sqrt{2}$.

L3 expressed as $\{M, 1, -M, 0, -M, 1, -M\}$, R3 expressed as $\{-M, -1, M, 0, -M, 1, -M\}$, -L3 expressed as $\{-M, -1, M, 0, M, -1, M\}$, and -R3 expressed as $\{M, 1, -M, 0, M, -1, M\}$ may be substituted to obtain the short training sequence S corresponding to the 320-MHz EHT-STF with the periodicity of 0.8 μs.

It should be understood that the short training sequence S corresponding to the EHT-STF with the periodicity of 0.8 μs and the channel bandwidth of 320 MHz may be expressed as any one of the foregoing 10 expressions.

It should be noted that the foregoing manner A and manner B are merely examples for description, and this embodiment of this application is not limited thereto.

It can be learned from the foregoing that L3 and R3 are sequences related to the short training sequence corresponding to 160 MHz and the periodicity of 0.8 μs. Therefore, the 320-MHz short training sequence can be compatible with the 160-MHz short training sequence. In addition, the 320-MHz short training sequence can support automatic gain control on a high-bandwidth (the bandwidth is greater than 160 MHz) channel. In addition, it is verified through simulation and comparison between the PAPRs in Table 5 and the PAPRs in 802.11ax (Table 1) that these short training sequences have comparatively small peak-to-average power ratios, and therefore can support automatic gain control on a high-bandwidth channel and can improve an estimation effect for an automatic gain control circuit at a receive end, thereby reducing a receive bit error rate. Therefore, the short training sequence proposed for a high channel bandwidth in this solution of this application can control a PAPR to be very small.

Scenario 2: The Periodicity is 1.6 μs.

Similarly, when the periodicity is 1.6 μs and the bandwidth of the target channel is 320 MHz, different 320-MHz EHT-STFs are obtained based on HE-STFs for different bandwidths of a reference channel. The following describes different expressions of the 320-MHz EHT-STF with reference to a manner A and a manner B.

Manner A

Obtain, based on an 80-MHz frequency-domain sequence HES with a periodicity of 1.6 μs, a short training sequence S corresponding to a 320-MHz EHT-STF with a periodicity of 1.6 μs.

The 320-MHz bandwidth has 1024×4=4096 tones in total. There are 12 guard tones on a left edge, 11 guard tones on a right edge, and 11+12=23 direct-current tones in the middle of the bandwidth. When the periodicity included in the short training field is 1.6 μs, the short training sequence may be expressed as $S_{-2024:8:2024}$, where -2024 indicates a subscript of a starting tone, 2024 indicates a subscript of an ending tone, 8 indicates a spacing, and -2024:8:2024 indicates starting with a tone whose subscript is -2024 and ending with a tone whose subscript is 2024, with a spacing of 8 tones in between. On other tones, a frequency-domain sequence value is 0.

Similarly, in this embodiment of this application, the short training sequence S corresponding to the 320-MHz EHT-STF with the periodicity of 1.6 μs may be determined by using at least the following three methods.

Method 1

Determine, based on a frequency-domain sequence HES for a bandwidth of a reference channel, the short training sequence S corresponding to the 320-MHz EHT-STF with the periodicity of 1.6 μs.

Optionally, the short training sequence S corresponding to the EHT-STF with the periodicity of 1.6 μs and the target channel bandwidth of 320 MHz may be expressed as follows:

$\{L2, 0, -R2, -1, L2, 0, -R2, 0, L2, 0, R2, -1, -L2, 0, -R2\}\cdot(1+j)/\sqrt{2}$; or
$\{-L2, 0, R2, 1, -L2, 0, R2, 0, -L2, 0, -R2, 1, L2, 0, R2\}\cdot(1+j)/\sqrt{2}$; or
$\{L2, 0, -R2, 0, L2, 0, -R2, 0, L2, 0, R2, -1, -L2, 0, -R2\}\cdot(1+j)/\sqrt{2}$; or
$\{-L2, 0, R2, 0, -L2, 0, R2, 0, -L2, 0, -R2, 1, L2, 0, R2\}\cdot(1+j)/\sqrt{2}$; or
$\{L2, 0, -R2, -1, L2, 0, -R2, 0, L2, 0, R2, 0, -L2, 0, -R2\}\cdot(1+j)/\sqrt{2}$; or
$\{-L2, 0, R2, 1, -L2, 0, R2, 0, -L2, 0, -R2, 0, L2, 0, R2\}\cdot(1+j)/\sqrt{2}$; or
$\{L2, 0, -R2, 1, L2, 0, -R2, 0, L2, 0, R2, -1, -L2, 0, -R2\}\cdot(1+j)/\sqrt{2}$; or
$\{-L2, 0, R2, -1, -L2, 0, R2, 0, -L2, 0, -R2, 1, L2, 0, R2\}\cdot(1+j)/\sqrt{2}$; or
$\{L2, 0, -R2, 0, L2, 0, -R2, 0, L2, 0, R2, 0, -L2, 0, -R2\}\cdot(1+j)/\sqrt{2}$; or
$\{-L2, 0, R2, 0, -L2, 0, R2, 0, -L2, 0, -R2, 0, L2, 0, R2\}\cdot(1+j)/\sqrt{2}$, where similarly, $L2 = HES_{-504:8:-8} \cdot \sqrt{2}/(1+j) = \{M, -1, M, -1, -M, -1, M\}$, and $HES_{-504:8:-8}$ is a part of $HES_{-504:8:504}$ on the left of a tone 0;

$R2 = HES_{8:8:504} \cdot \sqrt{2}/(1+j) = \{-M, 1, M, 1, -M, 1, -M\}$, and $HES_{8:8:504}$ is a part of $HES_{-504:8:504}$ on the right of the tone 0;

$HES_{-504:8:504}$ is an HES corresponding to 80 MHz and the periodicity of 1.6 μs; and L2 is expressed as $\{M, -1, M, -1, -M, -1, M\}$, R2 is expressed as $\{-M, 1, M, 1, -M, 1, -M\}$, $-L2=\{-M, 1, -M, 1, M, 1, -M\}$, and $-R2$ is expressed as $\{M, -1, -M, -1, M, -1, M\}$.

Therefore, the values given by the foregoing short training sequence each correspond to a frequency-domain sequence value that starts with a tone whose subscript is -2024 and ends with a tone whose subscript is 2024, with a spacing of 8 tones in between.

It should be noted that the short training sequence S corresponding to the EHT-STF with the periodicity of 1.6 μs and the channel bandwidth of 320 MHz may be expressed as any one of the foregoing 10 expressions.

It can be learned from the foregoing that, by using the method 1, the short training sequence corresponding to the 320-MHz EHT-STF with the periodicity of 1.6 μs may be obtained through transformation based on an HES specified in a standard.

Method 2

Obtain, through transformation based on an M-sequence, the short training sequence S corresponding to the 320-MHz EHT-STF with the periodicity of 1.6 μs.

Specifically, L2 expressed as $\{M, -1, M, -1, -M, -1, M\}$, R2 expressed as $\{-M, 1, M, 1, -M, 1, -M\}$, $-L2=\{-M, 1, -M, 1, M, 1, -M\}$, and $-R2$ expressed as $\{M, -1, -M, -1, M, -1, M\}$ are substituted, and it can be learned that the short training sequence corresponding to the 320-MHz EHT-STF with the periodicity of 1.6 µs may be expressed as follows:

{M, −1, M, −1, −M, M, 0, M, −1, −M, −1, M, −1, M, −1, M, M, −M, −1, M, 0, M, −1, −M, M, −1, M, 0, M, M, −M, −1, M, 0, −M, 1, M, 1, −M, 1, −M, −1, −M, 1, −M, 1, M, 1, −M, 0, M, −1, −M, −1, M, −1, M}·(1+j)/√2; or

{−M, 1, −M, 1, M, 1, −M, 0, −M, 1, M, 1, −M, 1, −M, 1, −M, 1, −M, 1, M, 1, −M, 0, −M, 1, M, 1, −M, 1, −M, 0, −M, 1, −M, 1, M, 1, −M, 0, M, −1, −M, −1, M, −1, M, 1, M, M, −1, −M, −1, M, 0, −M, 1, M, 1, −M, 1, −M}·(1+j)/√2, or

{M, −1, M, −1, −M, −1, M, 0, M, −1, −M, −1, M, −1, M, 0, M, −1, M, −1, −M, −1, M, 0, M, −1, −M, −1, M, −1, M, 0, M, −1, M, −1, −M, −1, M, 0, −M, 1, M, 1, −M, 1, −M, −1, −M, 1, −M, 1, M, 1, −M, 0, M, −1, −M, −1, M, −1, M}·(1+j)/√2; or

{−M, 1, −M, 1, M, 1, −M, 0, −M, 1, M, 1, −M, 1, −M, 0, −M, 1, −M, 1, M, 1, −M, 0, −M, 1, M, 1, −M, 1, −M, 0, −M, 1, −M, 1, M, 1, −M, 0, M, −1, −M, −1, M, −1, M, 1, M, −1, M, −1, −M, −1, M, 0, −M, 1, M, 1, −M, 1, −M}·(1+j)/√2; or

{M, −1, M, −1, −M, −1, M, 0, M, −1, −M, −1, M, M, 1, M, −1, M, −1, −M, −1, M, 0, M, −1, −M, M, −1, M, 0, M, M, −M, −1, M, 0, −M, 1, M, 1, −M, 1, −M, −1, −M, 1, −M, 1, M, 1, −M, 0, M, −M, −1, −M, −1, M, −1, M}; or

{−M, 1, −M, 1, M, 1, −M, 0, −M, 1, M, 1, −M, 1, −M, −1, −M, 1, −M, 1, M, 1, −M, 0, −M, 1, M, 1, −M, 1, −M, 0, −M, 1, −M, 1, M, 1, −M, 0, M, M, 1, M, −1, M, −1, −M, −1, M, 0, −M, 1, M, 1, −M, 1, −M}·(1+j)/√2; or

{M, −1, M, −1, −M, M, 0, M, −1, −M, −1, M, −1, M, −1, M, M, −M, −1, M, 0, M, −1, −M, −1, M, −1, M, 0, M, −1, M, −M, M, 0, −M, 1, M, 1, −M, 1, −M, 0, −M, 1, −M, 1, M, 1, −M, 0, M, −1, −M, −1, M, −1, M}·(1+j)/√2; or

{−M, 1, −M, 1, M, 1, −M, 0, −M, 1, M, 1, −M, 1, −M, 1, −M, 1, −M, 1, M, 1, −M, 0, −M, 1, M, −M, M, −1, M, 0, M, M, −1, −M, −1, M, 0, −M, 1, M, 1, −M, 1, −M}·(1+j)/√2; or

{M, −1, M, −1, −M, −1, M, 0, M, −1, −M, M, −1, M, 0, M, −1, M, −1, −M, −1, M, 0, M, −1, −M, −1, M, −1, M, 0, M, −1, M, −M, M, 0, −M, 1, M, 1, −M, 1, −M, 0, −M, 1, 1, −M, 1 M, 1, −M, 0, M, −1, −M, −1, M, −1, M, −1, M}·(1+j)/√2; or

{−M, 1, −M, 1, M, 1, −M, 0, −M, 1, M, 1, −M, 1, −M, 0, −M, 1, −M, 1, M, 1, −M, 0, −M, 1, M, −M, −M, 0, −M, −M, M, −M, 0, M, −1, −M, −1, M, M, 0, M, −1, M, −M, −1, M, 0, −M, 1, M, 1, −M, 1, −M}·(1+j)/√2.

Therefore, the values given by the foregoing short training sequence each correspond to a frequency-domain sequence value that starts with a tone whose subscript is −2024 and ends with a tone whose subscript is 2024, with a spacing of 8 tones in between.

It should be noted that the short training sequence S corresponding to the EHT-STF with the periodicity of 1.6 µs and the channel bandwidth of 320 MHz may be expressed as any one of the foregoing 10 expressions.

It can be learned from the foregoing that, by using the method 2, the short training sequence S corresponding to the 320-MHz EHT-STF with the periodicity of 1.6 µs may be obtained through transformation based on the M-sequence.

Method 3

The short training sequence corresponding to the EHT-STF in the foregoing method 1 or method 2 is directly cached or stored locally. When the short training sequence corresponding to the EHT-STF is to be used, the short training sequence corresponding to the EHT-STF is directly obtained locally.

It should be understood that the foregoing three methods are merely examples for description, and this application is not limited thereto. Any method that can be used to obtain the short training sequence corresponding to the 320-MHz EHT-STF with the periodicity of 1.6 µs falls within the protection scope of this embodiment of this application.

The short training sequence S corresponding to the 320-MHz EHT-STF with the periodicity of 1.6 µs may be obtained through simulation calculation. For example, if the method 1 is used, the short training sequence S corresponding to the 320-MHz EHT-STF with the periodicity of 1.6 µs may be obtained through calculation based on a stored frequency-domain sequence HES that corresponds to an HE-STF and by using a corresponding formula. For another example, if the method 2 is used, the short training sequence S corresponding to the 320-MHz EHT-STF with the periodicity of 1.6 µs may be obtained through calculation based on a stored or protocol-specified M-sequence by using a corresponding formula.

Specifically, the foregoing sequences are designed based on the frequency-domain sequence $HES_{-504:8:504}$ defined in 802.11ax for the 80-MHz HE-STF with the periodicity of 1.6 µs. A detailed design formula for the short training sequence S corresponding to the 320-MHz EHT-STF with the periodicity of 1.6 µs is as follows:

$$S_{-2024:8:2024} = \{c_1 \cdot L2, 0, c_2 \cdot R2, a_1, c_3 \cdot L2, 0, c_4 \cdot R2, 0, c_5 \cdot L2, 0, c_6 \cdot R2, a_2, c_7 \cdot L2, 0, c_8 \cdot R2\} \cdot (1+j)/\sqrt{2} \quad (7)$$

where $L2 = HES_{-504:8:-8} \cdot \sqrt{2}/(1+j) = \{M, -1, M, -1, -M, -1, M\}$;
$R2 = HES_{8:8:504} \cdot \sqrt{2}/(1+j) = \{-M, 1, M, 1, -M, 1, -M\}$;
$S_{\pm 2024} = 0$; and
similarly,
a value of $a_i$ is $\{-1, 0, 1\}$, and $i = 1, 2$; and
a value of $c_j$ is $\{-1, 1\}$, and $j = 1, 2, 3, 4, 5, 6, 7, 8$.

Therefore, when the short training sequence S corresponding to the 320-MHz EHT-STF with the periodicity of 1.6 µs is obtained by using the method 1, the short training sequence S may be obtained based on the stored $HES_{-504:8:-8}$ and $HES_{8:8:504}$ by using the formula (7). Alternatively, when the short training sequence S corresponding to the 320-MHz EHT-STF with the periodicity of 1.6 µs is obtained by using the method 2, the short training sequence S may be obtained based on the M-sequence by using the formula (7).

The short training sequence corresponding to the 320-MHz EHT-STF with the periodicity of 1.6 µs may be obtained based on the formula (7). In addition, simulation calculation is performed, for example, $a_i$ and $c_i$ are adjusted, so that a PAPR corresponding to the short training sequence corresponding to the EHT-STF is less than or equal to a preset fifth threshold, to obtain a sequence with comparatively good performance.

Specifically, after $2^8 \times 3^2 = 2304$ exhaustive searches are performed, all possible $S_{-2024:8:2024}$ and corresponding PAPR values may be obtained, and $S_{-2024:8:2024}$ with a smallest PAPR is finally obtained through comparison. Table 6 shows $a_i$ and $c_i$ in 10 groups of optimal S when the short training sequence S corresponding to the 320-MHz EHT-STF with the periodicity of 1.6 µs is designed based on the frequency-domain sequence HES corresponding to the 80-MHz HE-STF with the periodicity of 1.6 µs.

Setting a preset threshold (for example, the preset fifth threshold) may be performing exhaustion on the parameter set A and the parameter set C, and performing setting based on a minimum PAPR value (for example, 10 groups of results with minimum PAPRs in Table 6) obtained in an exhaustion process, or may be performing setting comprehensively with reference to a minimum PAPR value obtained in an exhaustion result, a property of a sequence, and the like, or may be performing setting comprehensively with reference to a minimum PAPR value obtained in an exhaustion result, a preset parameter, and the like; or the preset threshold may be specified in advance; or the preset threshold may be obtained based on a plurality of experiment results, or the like.

TABLE 6

Values of parameter sets for the short training sequence S corresponding to the 320-MHz EHT-STF with the periodicity of 1.6 μs

| Sequence number | $a_1$ | $a_2$ | $c_1$ | $c_2$ | $c_3$ | $c_4$ | $c_5$ | $c_6$ | $c_7$ | $c_8$ | PAPR (dB) |
|---|---|---|---|---|---|---|---|---|---|---|---|
| 1 | −1 | −1 | 1 | −1 | 1 | −1 | 1 | 1 | −1 | −1 | 6.1586 |
| 2 | 1 | 1 | −1 | 1 | −1 | 1 | −1 | −1 | 1 | 1 | 6.1586 |
| 3 | 0 | −1 | 1 | −1 | 1 | −1 | 1 | 1 | −1 | −1 | 6.2975 |
| 4 | 0 | 1 | −1 | 1 | −1 | 1 | −1 | −1 | 1 | 1 | 6.2975 |
| 5 | −1 | 0 | 1 | −1 | 1 | −1 | 1 | 1 | −1 | −1 | 6.2986 |
| 6 | 1 | 0 | −1 | 1 | −1 | 1 | −1 | −1 | 1 | 1 | 6.2986 |
| 7 | 1 | −1 | 1 | −1 | 1 | −1 | 1 | 1 | −1 | −1 | 6.4188 |
| 8 | −1 | 1 | −1 | 1 | −1 | 1 | −1 | −1 | 1 | 1 | 6.4188 |
| 9 | 0 | 0 | 1 | −1 | 1 | −1 | 1 | 1 | −1 | −1 | 6.4367 |
| 10 | 0 | 0 | −1 | 1 | −1 | 1 | −1 | −1 | 1 | 1 | 6.4367 |

The values of $a_i$ and $c_i$ in the obtained 10 groups of results are separately substituted into the formula (7), and it can be learned that the short training sequence S corresponding to the 320-MHz EHT-STF with the periodicity of 1.6 μs may be expressed as follows:

{L2, 0, −R2, −1, L2, 0, −R2, 0, L2, 0, R2, −1, −L2, 0, −R2}·(1+j)/√2; or

{−L2, 0, R2, 1, −L2, 0, R2, 0, −L2, 0, −R2, 1, L2, 0, R2}·(1+j)/√2; or

{L2, 0, −R2, 0, L2, 0, −R2, 0, L2, 0, R2, −1, −L2, 0, −R2}·(1+j)/√2; or

{−L2, 0, R2, 0, −L2, 0, R2, 0, −L2, 0, −R2, 1, L2, 0, R2}·(1+j)/√2; or

{L2, 0, −R2, −1, L2, 0, −R2, 0, L2, 0, R2, 0, −L2, 0, −R2}·(1+j)/√2; or

{−L2, 0, R2, 1, −L2, 0, R2, 0, −L2, 0, −R2, 0, L2, 0, R2}·(1+j)/√2; or

{L2, 0, −R2, 1, L2, 0, −R2, 0, L2, 0, R2, −1, −L2, 0, −R2}·(1+j)/√2; or

{−L2, 0, R2, −1, −L2, 0, R2, 0, −L2, 0, −R2, 1, L2, 0, R2}·(1+j)/√2; or

{L2, 0, −R2, 0, L2, 0, −R2, 0, L2, 0, R2, 0, −L2, 0, −R2}·(1+j)/√2; or

{−L2, 0, R2, 0, −L2, 0, R2, 0, −L2, 0, −R2, 0, L2, 0, R2}·(1+j)/√2.

L2 expressed as {M, −1, M, −1, −M, −1, M}, R2 expressed as {−M, 1, M, 1, −M, 1, −M}, −L2={−M, 1, −M, 1, M, 1, −M}, and −R2 expressed as {M, −1, −M, −1, M, −1, M} may be substituted to obtain the short training sequence S corresponding to the 320-MHz EHT-STF with the periodicity of 1.6 μs.

It should be noted that the short training sequence S corresponding to the EHT-STF with the periodicity of 1.6 μs and the channel bandwidth of 320 MHz may be expressed as any one of the foregoing 10 expressions.

It can be learned from the foregoing that L2 and R2 are sequences related to the short training sequence corresponding to 80 MHz and the periodicity of 1.6 μs. Therefore, the 320-MHz short training sequence can be compatible with the 80-MHz short training sequence. In addition, the 320-MHz short training sequence can support automatic gain control on a high-bandwidth (the bandwidth is greater than 160 MHz) channel. In addition, it is verified through simulation and comparison between the PAPRs in Table 6 and the PAPRs in 802.11ax (Table 1) that these short training sequences have comparatively small peak-to-average power ratios, and therefore can support automatic gain control on a high-bandwidth channel and can improve an estimation effect for an automatic gain control circuit at a receive end, thereby reducing a receive bit error rate. Therefore, the short training sequence proposed for a high channel bandwidth in this solution of this application can control a PAPR to be very small.

Manner B

Obtain, based on a 160-MHz frequency-domain sequence HES with a periodicity of 1.6 μs, a short training sequence S corresponding to a 320-MHz EHT-STF with a periodicity of 1.6 μs.

The 320-MHz bandwidth has 2048×4=4096 tones in total. When the periodicity included in the short training field is 1.6 μs, the short training sequence may be expressed as $S_{-2040:8:2040}$, where −2040 indicates a subscript of a starting tone, 2040 indicates a subscript of an ending tone, 8 indicates a spacing, and −2040:8:2040 indicates starting with a tone whose subscript is −2040 and ending with a tone whose subscript is 2040, with a spacing of 8 tones in between. On other tones, a frequency-domain sequence value is 0.

Similarly, in this embodiment of this application, the short training sequence corresponding to the 320-MHz EHT-STF with the periodicity of 1.6 μs may be determined by using at least the following three methods.

Method 1

Determine, based on a frequency-domain sequence HES for a bandwidth of a reference channel, the short training sequence S corresponding to the 320-MHz EHT-STF with the periodicity of 1.6 μs.

Optionally, the short training sequence corresponding to the EHT-STF with the periodicity of 1.6 μs and the target channel bandwidth of 320 MHz may be expressed as follows:

{L4, 1, R4, 0, L4, −1, −R4}·(1+j)/√2; or

{−L4, −1, −R4, 0, −L4, 1, R4}·(1+j)/√2; or

{L4, 0, R4, 0, L4, 0, −R4}·(1+j)/√2; or

{−L4, 0, −R4, 0, −L4, 0, R4}·(1+j)/√2; or

{L4, 0, R4, 0, L4, −1, −R4}·(1+j)/√2; or

{−L4, 0, −R4, 0, −L4, 1, R4}·(1+j)/√2; or

{L4, 0, −R4, 0, L4, 1, R4}·(1+j)/√2; or

{−L4, 0, R4, 0, −L4, −1, −R4}·(1+j)/√2; or

{L4, 1, R4, 0, L4, 0, −R4}·(1+j)/√2; or

{−L4, −1, −R4, 0, −L4, 0, R4}·(1+j)/√2, where similarly, L4=$HES_{-1016:8:-8}$·√2/(1+j)+={M, −1, M, −1, −M, −1, M, 0, −M, 1, M, 1, −M, 1, −M}, and $HES_{-1016:8:-8}$ is a part of $HES_{-1016:8:1016}$ on the left of a tone 0;

R4=$HES_{8:8:1008}$·√2/(1+j)={−M, 1, −M, 1, M, 1, −M, 0, −M, 1, M, 1, −M, 1, −M}, and $HES_{8:8:1008}$ is a part of $HES_{-1016:8:1016}$ on the right of the tone 0; and $HES_{-1008:16:1008}$ is an HES corresponding to 160 MHz and the periodicity of 0.8 μs.

Therefore, the values given by the foregoing short training sequence each correspond to a frequency-domain sequence value that starts with a tone whose subscript is −2040 and ends with a tone whose subscript is 2040, with a spacing of 8 tones in between.

It should be noted that the short training sequence S corresponding to the EHT-STF with the periodicity of 1.6 μs and the channel bandwidth of 320 MHz may be expressed as any one of the foregoing 10 expressions.

It can be learned from the foregoing that, by using the method 1, the short training sequence S corresponding to the 320-MHz EHT-STF with the periodicity of 1.6 μs may be obtained through transformation based on an HES specified in a standard.

Method 2

Obtain, through transformation based on an M-sequence, the short training sequence S corresponding to the EHT-STF with the periodicity of 1.6 μs and the bandwidth of 320 MHz.

Specifically, L4 expressed as {M, −1, M, −1, −M, −1, M, 0, −M, 1, M, 1, −M, 1, −M}, R4 expressed as {−M, 1, −M, 1, M, 1, −M, 0, −M, 1, M, 1, −M, 1, −M}, −L4 expressed as {−M, 1, −M, 1, M, 1, −M, 0, M, −1, −M, −1, M, −1, M}, and −R4 expressed as {M, −1, M, −1, −M, −1, M, 0, M, −1, −M, −1, M, −1, M} are substituted, and it can be learned that the 320-MHz EHT-STF with the periodicity of 1.6 μs may be expressed as follows:

{M, −1, M, −1, −M, −1, M, 0, −M, 1, M, 1, −M, 1, −M, 1, −M, 1, −M, 1, M, 1, −M, 0, −M, 1, M, 1, −M, 1, −M, 0, M, −1, M, −1, −M, −1, M, 0, −M, 1, M, 1, −M, 1, −M, −1, M, −1, M, −1, −M, −1, M, 0, M, −1, −M, −1, M, −1, M}·(1+j)/√2; or

{−M, 1, −M, 1, −M, 1, 0, M, −1, −M, −1, M, −1, M, −1, M, −1, M, −1, −M, −1, M, 0, M, −1, −M, −1, M, −1, M, 0, −M, 1, −M, 1, M, 1, −M, 0, M, −1, −M, −1, M, −1, M, 1, −M, 1, −M, 1, M, 1, −M, 0, −M, 1, M, 1, −M, 1, −M}·(1+j)/√2; or

{M, −1, M, −1, −M, −1, M, 0, −M, 1, M, 1, −M, 1, −M, 0, −M, 1, −M, 1, M, 1, −M, 0, −M, 1, M, 1, −M, 1, −M, 0, M, −1, M, −1, −M, −1, M, 0, −M, 1, M, 1, −M, 1, −M, 0, M, −1, M, −1, −M, −1, M, 0, −M, 1, −M, 1, M, −1, M, −1, M}·(1+j)/√2; or

{−M, 1, −M, 1, M, 1, −M, 0, M, −1, −M, −1, M, −1, M, 0, M, −1, M, −1, −M, −1, M, 0, M, −1, −M, −1, M, −1, M, M, 0, −M, 1, −M, 1, M, 1, −M, 0, M, −1, −M, −1, M, −1, M, 0, −M, 1, −M, 1, M, 1, −M, 0, −M, 1, M, 1, −M, 1, −M}·(1+j)/√2; or

{M, −1, M, −1, −M, −1, M, 0, −M, 1, M, 1, −M, 1, −M, 0, −M, 1, −M, 1, M, 1, −M, 0, −M, 1, M, 1, −M, 1, −M, 0, M, −1, M, −1, −M, −1, M, 0, −M, 1, M, 1, −M, 1, −M, −1, M, −1, M, −1, −M, −1, M, 0, M, −1, −M, −1, M, −1, M}·(1+j)/√2; or

{−M, 1, −M, 1, M, 1, −M, 0, M, −1, −M, −1, M, −1, M, 0, M, −1, M, −1, −M, −1, M, 0, M, −1, −M, −1, M, −1, M, M, 0, −M, 1, −M, 1, M, 1, −M, 0, M, −1, −M, −1, M, −1, M, 1, −M, 1, −M, 1, M, 1, −M, 0, −M, 1, M, 1, −M, 1, −M}·(1+j)/√2; or

{M, −1, M, −1, −M, −1, M, 0, −M, 1, M, 1, −M, 1, −M, 0, M, −1, M, −1, −M, −1, M, 0, M, −1, −M, −1, M, −1, M, 0, M, −1, M, −1, −M, −1, M, 0, −M, 1, M, 1, −M, 1, −M, 1, −M, 1, −M, 1, M, 1, −M, 0, −M, 1, M, 1, −M, 1, −M}·(1+j)/√2; or

{−M, 1, −M, 1, M, 1, −M, 0, M, −1, −M, −1, M, −1, M, 0, −M, 1, −M, 1, M, 1, −M, 0, M, −1, −M, −1, M, −1, M, 0, −M, 1, −M, 1, M, 1, −M, 0, −M, 1, M, 1, −M, 1, −M, M, −1, M, −1, −M, −1, M, 0, M, −1, −M, −1, M, −1, M, −1, M}·(1+j)/√2; or

{M, −1, M, −1, −M, −1, M, 0, −M, 1, M, 1, −M, 1, −M, 1, −M, 1, −M, 1, M, 1, −M, 0, −M, 1, M, 1, −M, 1, −M, 0, M, −1, M, −1, −M, −1, M, 0, −M, 1, M, 1, −M, 1, −M, 0, M, −1, M, −1, −M, −1, M, 0, −M, 1, −M, 1, M, −1, M, −1, M}·(1+j)/√2; or

{−M, 1, −M, 1, M, 1, −M, 0, M, −1, −M, −1, M, −1, M, −1, M, −1, M, −1, −M, −1, M, 0, M, −1, −M, −1, M, −1, M, M, 0, −M, 1, −M, 1, M, 1, −M, 0, M, −1, −M, −1, M, −1, M, 0, −M, 1, −M, 1, M, 1, −M, 0, −M, 1, M, 1, −M, 1, −M}·(1+j)/√2.

Therefore, the values given by the foregoing short training sequence each correspond to a frequency-domain sequence value that starts with a tone whose subscript is −2040 and ends with a tone whose subscript is 2040, with a spacing of 8 tones in between.

It should be noted that the short training sequence S corresponding to the EHT-STF with the periodicity of 1.6 μs and the bandwidth of 320 MHz may be expressed as any one of the foregoing 10 expressions.

It can be learned from the foregoing that, by using the method 2, the short training sequence S corresponding to the 320-MHz EHT-STF with the periodicity of 1.6 μs may be obtained through transformation based on the M-sequence.

Method 3

The short training sequence corresponding to the EHT-STF in the foregoing method 1 or method 2 is directly cached or stored locally. When the short training sequence corresponding to the EHT-STF is to be used, the short training sequence corresponding to the EHT-STF is directly obtained locally.

It should be understood that the foregoing three methods are merely examples for description, and this application is not limited thereto. Any method that can be used to obtain the short training sequence corresponding to the 320-MHz EHT-STF with the periodicity of 1.6 μs falls within the protection scope of this embodiment of this application.

Similar to that in the scenario 1, the short training sequence S corresponding to the 320-MHz EHT-STF with the periodicity of 1.6 μs may be obtained through simulation calculation. For example, if the method 1 is used, the short training sequence S corresponding to the 320-MHz EHT-STF with the periodicity of 1.6 μs may be obtained through calculation based on a stored frequency-domain sequence HES that corresponds to an HE-STF and by using a corresponding formula. For another example, if the method 2 is used, the short training sequence S corresponding to the 320-MHz EHT-STF with the periodicity of 1.6 μs may be obtained through calculation based on a stored or protocol-specified M-sequence by using a corresponding formula.

Specifically, the 320-MHz EHT-STF may be alternatively constructed by rotating and combining HE-STFs for channels with a bandwidth of 160 MHz. Specifically, the short training sequence S corresponding to the 320-MHz EHT-STF with the periodicity of 1.6 μs may be generated based on the frequency-domain sequence $HES_{-1016:8:1016}$ defined in 802.11ax for the 160-MHz HE-STF with the periodicity of 1.6 μs. A detailed design formula thereof is as follows:

$$S_{-2040:8:2040} = \{c_1 \cdot L4, a_1, c_2 \cdot R4, 0, c_3 \cdot L4, a_2, c_4 \cdot R4\} \cdot (1+j)/\sqrt{2} \quad (8)$$

where $L4 = HES_{-1016:8:-8} \cdot \sqrt{2}/(1+j) = \{M, -1, M, -1, -M, -1, M, 0, -M, 1, M, 1, -M, 1, -M\}$;

$R4 = HES_{8:8:1008} \cdot \sqrt{2}/(1+j) = \{-M, 1, -M, 1, M, 1, -M, 0, -M, 1, M, 1, -M, 1, -M\}$; and similarly, a value of $a_i$ is $\{-1, 0, 1\}$, and i=1, 2; and a value of $c_j$ is $\{-1, 1\}$, and j=1, 2, 3, 4.

Similarly, when the short training sequence S corresponding to the 320-MHz EHT-STF with the periodicity of 1.6 μs is obtained by using the method 1, the short training sequence S may be obtained based on the stored $HES_{-1016:8:-8}$ and $HES_{8:8:1008}$ by using the formula (8). Alternatively, when the short training sequence S corresponding to the 320-MHz EHT-STF with the periodicity of 1.6 μs is obtained by using the method 2, the short training sequence S may be obtained based on the M-sequence by using the formula (8).

The short training sequence S corresponding to the 320-MHz EHT-STF with the periodicity of 1.6 μs may be obtained based on the formula (8). In addition, simulation calculation is performed, for example, $a_i$ and $c_i$ are adjusted, so that a PAPR corresponding to the short training sequence S corresponding to the EHT-STF is less than or equal to a preset sixth threshold, to obtain a sequence with comparatively good performance.

Specifically, after $2^4 \times 3^2 = 144$ exhaustive searches are performed, all possible $S_{-2040:8:2040}$ and corresponding PAPR values may be obtained, and $S_{-2040:8:2040}$ with a smallest PAPR is finally obtained through comparison. Table 7 shows $a_i$ and $c_i$ in 10 groups of optimal S when the short training sequence S corresponding to the 320-MHz EHT-STF with the periodicity of 1.6 μs is designed based on the short training sequence corresponding to the 160-MHz HE-STF with the periodicity of 1.6 μs.

Setting a preset threshold (for example, the preset sixth threshold) may be performing exhaustion on the parameter set A and the parameter set C, and performing setting based on a minimum PAPR value (for example, 10 groups of results with minimum PAPRs in Table 7) obtained in an exhaustion process, or may be performing setting comprehensively with reference to a minimum PAPR value obtained in an exhaustion result, a property of a sequence, and the like, or may be performing setting comprehensively with reference to a minimum PAPR value obtained in an exhaustion result, a preset parameter, and the like; or the preset threshold may be specified in advance; or the preset threshold may be obtained based on a plurality of experiment results, or the like.

TABLE 7

Values of parameter sets for the short training sequence S corresponding to the 320-MHz EHT-STF with the periodicity of 1.6 μs

| Sequence number | $a_1$ | $a_2$ | $c_1$ | $c_2$ | $c_3$ | $c_4$ | PAPR (dB) |
|---|---|---|---|---|---|---|---|
| 1 | 1 | −1 | 1 | 1 | 1 | −1 | 6.5894 |
| 2 | −1 | 1 | −1 | −1 | −1 | 1 | 6.5894 |
| 3 | 0 | 0 | 1 | 1 | 1 | −1 | 6.599 |
| 4 | 0 | 0 | −1 | −1 | −1 | 1 | 6.599 |
| 5 | 0 | −1 | 1 | 1 | 1 | −1 | 6.6319 |
| 6 | 0 | 1 | −1 | −1 | −1 | 1 | 6.6319 |
| 7 | 0 | 1 | 1 | −1 | 1 | 1 | 6.6514 |
| 8 | 0 | −1 | −1 | 1 | −1 | −1 | 6.6514 |
| 9 | 1 | 0 | 1 | 1 | 1 | −1 | 6.6685 |
| 10 | −1 | 0 | −1 | −1 | −1 | 1 | 6.6685 |

The values of $a_i$ and $c_i$ in the obtained 10 groups of results are separately substituted into the formula (8), and it can be learned that the short training sequence S corresponding to the 320-MHz EHT-STF with the periodicity of 1.6 μs may be expressed as follows:

{L4, 1, R4, 0, L4, −1, −R4}·(1+j)/√2; or
{−L4, −1, −R4, 0, −L4, 1, R4}·(1+j)/√2; or
{L4, 0, R4, 0, L4, 0, −R4}·(1+j)/√2; or
{−L4, 0, −R4, 0, −L4, 0, R4}·(1+j)/√2; or
{L4, 0, R4, 0, L4, −1, −R4}·(1+j)/√2; or
{−L4, 0, −R4, 0, −L4, 1, R4}·(1+j)/√2; or
{L4, 0, −R4, 0, L4, 1, R4}·(1+j)/√2; or
{−L4, 0, R4, 0, −L4, −1, −R4}·(1+j)/√2; or
{L4, 1, R4, 0, L4, 0, −R4}·(1+j)/√2; or
{−L4, −1, −R4, 0, −L4, 0, R4}·(1+j)/√2.

L4 expressed as {M, −1, M, −1, −M, −1, M, 0, −M, 1, M, 1, −M, 1, −M}, R4 expressed as
{−M, 1, −M, 1, M, 1, −M, 0, −M, 1, M, 1, −M, 1, −M},
−L4 expressed as {−M, 1, −M, 1, M, 1, −M, 0, M, −1, −M, −1, M, −1, M}, and −R4 expressed as {M, −1, M, −1, −M, −1, M, 0, M, −1, −M, −1, M, −1, M} may be substituted to obtain the short training sequence corresponding to the 320-MHz EHT-STF with the periodicity of 1.6 μs.

It should be noted that the short training sequence S corresponding to the EHT-STF with the periodicity of 1.6 μs and the channel bandwidth of 320 MHz may be expressed as any one of the foregoing 10 expressions.

It should be noted that the foregoing manner A and manner B are merely examples for description, and this application is not limited thereto.

It can be learned from the foregoing that L4 and R4 are sequences related to the short training sequence corresponding to 160 MHz and the periodicity of 1.6 μs. Therefore, the 320-MHz short training sequence can be compatible with the 160-MHz short training sequence. In addition, the 320-MHz short training sequence can support automatic gain control on a high-bandwidth (the bandwidth is greater than 160 MHz) channel. In addition, it is verified through simulation and comparison between the PAPRs in Table 7 and the PAPRs in 802.11ax (Table 1) that these short training sequences have comparatively small peak-to-average power ratios, and therefore can support automatic gain control on a high-bandwidth channel and can improve an estimation effect for an automatic gain control circuit at a receive end, thereby reducing a receive bit error rate. Therefore, the short training sequence proposed for a high channel bandwidth in this solution of this application can control a PAPR to be very small.

It can be learned from the foregoing that, in this embodiment of this application, the short training sequence corresponding to the 240-MHz EHT-STF and the short training sequence corresponding to the 320-MHz EHT-STF are proposed, and the short training sequence corresponding to the EHT-STF may be directly stored at a local end; or the M-sequence may be stored at a local end or specified in a protocol, and the short training sequence corresponding to the EHT-STF is obtained through calculation based on the M-sequence by using a corresponding formula; or the short training sequence corresponding to the HE-STF may be stored, and the short training sequence corresponding to the EHT-STF may be obtained through calculation based on the short training sequence corresponding to the HE-STF by using a corresponding formula. This is not limited in this embodiment of this application.

It should be noted that the foregoing describes in detail the method provided in this application by using only 240 MHz and 320 MHz as examples, but this should not constitute a limitation on a channel bandwidth to which the method provided in this application is applicable. Short training sequences corresponding to other bandwidths greater than 160 MHz, for example, 200 MHz and 280 MHz, may also be obtained according to the short training sequence design method provided in this embodiment of this application, and can be all compatible with an existing 80-MHz short training sequence (or a rotation factor). Based on the short training sequence design method provided in this application, a person skilled in the art may easily figure out that the method may be applied to a channel bandwidth of another size after undergoing a change or a substitution.

It can be learned from the foregoing that, for 240 MHz or 320 MHz and the periodicity of 0.8 µs or 1.6 µs, 10 short training sequences S corresponding to an EHT-STF are proposed based on the frequency-domain sequence HES corresponding to the HE-STF with the bandwidth of 80 MHz and the frequency-domain sequence HES corresponding to the HE-STF with the bandwidth of 160 MHz. Therefore, compatibility with the existing HE-STF with the bandwidth of 80 MHz in 802.11ax is considered for both the EHT-STF for the channel with the bandwidth of 240 MHz and the EHT-STF for the channel with the bandwidth of 320 MHz, and compatibility with the existing 160-MHz HE-STF in 802.11ax is further considered for the EHT-STF for the channel with the bandwidth of 320 MHz. In addition, in this embodiment of this application, for the channel with the bandwidth of 240 MHz and the channel with the bandwidth of 320 MHz, exhaustive simulation is performed on parameters, and the PAPRs in Table 2 to Table 7 are compared with the PAPRs in 802.11ax (Table 1), to verify that the short training sequence provided in this embodiment of this application corresponds to a comparatively small peak-to-average power ratio PAPR and has comparatively good performance, thereby improving an estimation effect for an automatic gain control circuit at a receive end, and reducing a receive bit error rate. Therefore, the short training sequence proposed for a high channel bandwidth in this solution of this application can control a PAPR to be very small.

The foregoing describes in detail the short training field sending method provided in the embodiments of this application with reference to FIG. 1 to FIG. 6. The following describes in detail a short training field sending apparatus provided in the embodiments of this application with reference to FIG. 7 and FIG. 8.

Figure 7:
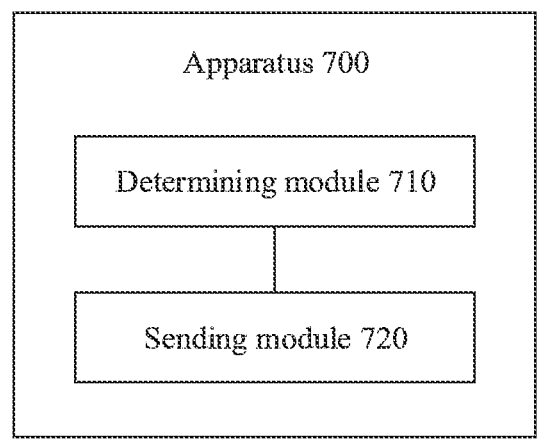
FIG. 7 is a schematic block diagram of a short training field sending apparatus according to an embodiment of this application.

FIG. 7 is a schematic block diagram of a short training field sending apparatus according to an embodiment of this application. As shown in FIG. 7, the apparatus 700 may include a determining module 710 and a sending module 720.

In a possible design, the apparatus 700 may correspond to the network device in the foregoing method embodiment, for example, may be the network device, or a chip configured in the network device.

The determining module 710 is configured to determine a short training sequence.

The sending module 720 is configured to send a short training field on a target channel. The short training field is obtained by performing inverse fast Fourier transformation IFFT on the short training sequence. A bandwidth of the target channel is greater than 160 MHz.

Specifically, the apparatus 700 may include modules configured to perform the method performed by the network device in the method 200. In addition, the modules in the apparatus 700 and the foregoing other operations and/or functions are separately used to implement corresponding procedures of the method 200 in FIG. 5.

When the apparatus 700 is configured to perform the method 200 in FIG. 5, the determining module 710 may be configured to perform step 210 in the method 200 and a step of generating a short training sequence, and the sending module 720 may be configured to perform step 220 in the method 200.

It should be understood that specific processes of performing the foregoing corresponding steps by the modules are described in detail in the foregoing method embodiment. For brevity, details are not described herein again.

Figure 8:
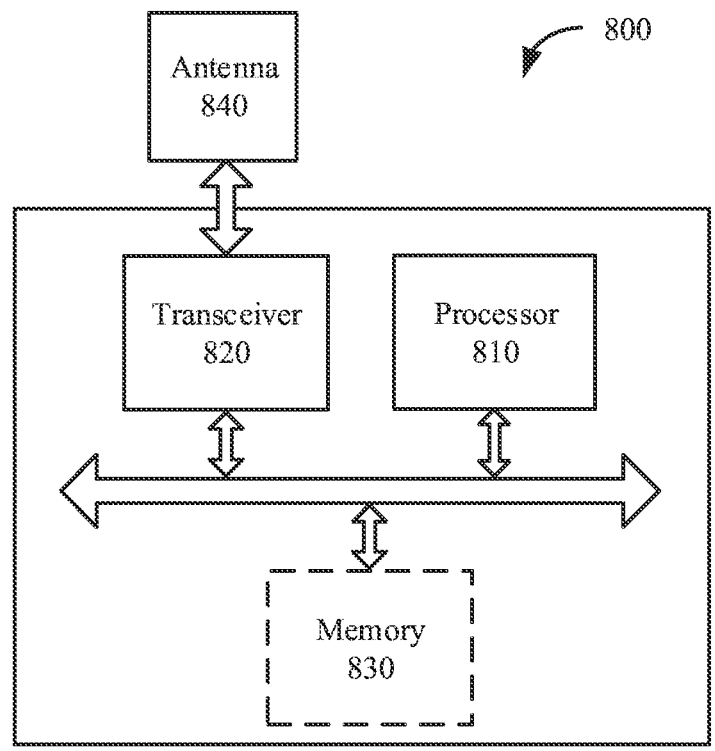
FIG. 8 is a schematic structural diagram of a network device according to an embodiment of this application.

It should be further understood that the determining module 710 in the apparatus 700 may correspond to a processor 810 in a network device 800 shown in FIG. 8, and the sending module 720 may correspond to a transceiver 820 in the network device 800 shown in FIG. 8.

FIG. 8 is a schematic structural diagram of the network device 800 according to an embodiment of this application. As shown in FIG. 8, the network device 800 includes the processor 810 and the transceiver 820. Optionally, the network device 800 further includes a memory 830. The processor 810, the transceiver 820, and the memory 830 communicate with each other through an internal connection path, and transfer a control signal and/or a data signal. The memory 830 is configured to store a computer program, and the processor 810 is configured to invoke the computer program from the memory 830 and run the computer program, to control the transceiver 820 to transmit or receive a signal.

The processor 810 and the memory 830 may be combined into one processing apparatus, and the processor 810 is configured to execute program code stored in the memory 830 to implement the foregoing functions. During specific implementation, the memory 830 may be alternatively integrated in the processor 810, or may be independent of the processor 810.

The network device 800 may further include an antenna 840, configured to send, by using a radio signal, a short training field output by the transceiver 820.

When a program instruction stored in the memory 830 is executed by the processor 810, the processor 810 is configured to determine a short training sequence.

Specifically, the network device 800 may include modules configured to perform the method 200 in FIG. 5. In addition, the modules in the network device 800 and the foregoing other operations and/or functions are separately used to implement corresponding procedures of the method 200 in FIG. 5. Specific processes of performing the foregoing corresponding steps by the modules are described in detail in the foregoing method embodiment. For brevity, details are not described herein again.

The processor 810 may be configured to perform an internal implementation action described in the foregoing method embodiment. For details, refer to the descriptions in the foregoing method embodiment. Details are not described herein again.

It should be understood that the processor in this embodiment of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like.

It should be further understood that the memory in this embodiment of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which serves as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

According to the method provided in the embodiments of this application, this application further provides a computer program product. The computer program product includes computer program code. When the computer program code runs on a computer, the computer is enabled to perform the method in the embodiment shown in FIG. 5.

According to the method provided in the embodiments of this application, this application further provides a computer-readable medium. The computer-readable medium stores program code. When the program code runs on a computer, the computer is enabled to perform the method in the embodiment shown in FIG. 5.

According to the method provided in the embodiments of this application, this application further provides a system, including the foregoing one or more terminal devices and one or more network devices.

A person of ordinary skill in the art may be aware that, in combination with the examples described in the embodiments disclosed in this specification, units, algorithms, and steps may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for convenience and brevity of description, for a detailed working process of the foregoing system, apparatus, and unit, reference may be made to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the function is implemented in a form of a software functional unit and sold or used as an independent product, the function may be stored in a computer-readable storage medium. Based on such an understanding, the technical solutions of this application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An apparatus applied in a wireless local area network (WLAN), the apparatus comprising:
   a processor, configured to determine a short training sequence; and
   a transceiver, configured to send the short training sequence on a channel, wherein a bandwidth of the channel is 320 MHz;
   wherein the short training sequence has a periodicity of 1.6 μs and satisfies the following:

$$S_{-2040:8:2040} = \{c1 \times (M,-1,M,-1,-M,-1,M), 0, C2 \times (-M, 1,M,1,-M,1,-M), a1, c3 \times (M,-1,M,-1,-M,-1,M), 0, c4 \times (-M,1,M,1,-M,1,-M), 0, c5 \times (M,-1,M,-1, -M,-1,M), 0, c6 \times (-M,1,M,1,-M,1,-M), a2, c7 \times (M,-1,M,-1,-M,-1,M), 0, c8 \times (-M,1,M,1,-M,1, -M)\} \times (1+j)/\sqrt{2};$$

wherein −2040:8:2040 refers to a tone subscript and is −2040, −2032, −2024, . . . , −8, 0, 8, . . . , 2024, 2032, 2040, and a value of other tones is 0; and
   wherein a value of $a_i$ is any one of $\{-1, 0, 1\}$, i=1, 2, a value of $c_j$ is any one of $\{-1, 1\}$, j=1, 2, 3, 4, 5, 6, 7, 8, and M=$\{-1, -1, -1, 1, 1, 1, -1, 1, 1, 1, -1, 1, 1, -1, 1\}$.

2. The apparatus according to claim 1, wherein a tone plan of the 320 MHz bandwidth of the channel uses four duplicated tone plans of 80 MHz, the 320 MHz bandwidth of the channel comprises 4096 total tones, and the 4096 total tones comprise 12 guard tones at a left edge of the 320 MHz bandwidth of the channel and 11 guard tones at a right edge of the 320 MHz bandwidth of the channel.

3. The apparatus according to claim 1, wherein the 320 MHz bandwidth of the channel comprises 23 direct-current tones in a middle of the 320 MHz bandwidth of the channel.

4. An apparatus applied in a wireless local area network (WLAN), the apparatus comprising:
   a transceiver, configured to receive a part or all of a 320 MHz short training sequence on a channel, wherein a bandwidth of the channel is 320 MHz; and
   a processor, configured to perform automatic gain control (AGC) estimation based on the 320 MHz short training sequence;

wherein the 320 MHz short training sequence has a periodicity of 1.6 µs and satisfies the following:

$$S_{-2040:8:2040} = \{c1 \times (M,-1,M,-1,-M,-1,M), 0, C2 \times (-M, 1,M,1,-M,1,-M), a_i, c3 \times (M,-1,M,-1,-M,-1,M), 0, c4 \times (-M,1,M,1,-M,1,-M), 0, c5 \times (M,-1,M,-1, -M,-1,M), 0, c6 \times (-M,1,M,1,-M,1,-M), a2, c7 \times (M,-1,M,-1,-M,-1,M), 0, c8 \times (-M,1,M,1,-M,1, -M)\} \times (1+j)/\sqrt{2};$$

wherein −2040:8:2040 refers to a tone subscript and is −2040, −2032, −2024, ..., −8, 0, 8, ..., 2024, 2032, 2040, and a value of other tones is 0; and wherein a value of $a_i$ is any one of $\{-1, 0, 1\}$, i=1, 2, a value of $c_j$ is any one of $\{-1, 1\}$, j=1, 2, 3, 4, 5, 6, 7, 8, and M={−1, −1, −1, 1, 1, 1, −1, 1, 1, 1, −1, 1, 1, −1, 1}.

5. The apparatus according to claim 4, wherein a tone plan of the 320 MHz bandwidth of the channel uses four duplicated tone plans of 80 MHz, the 320 MHz bandwidth of the channel comprises 4096 total tones, and the 4096 total tones comprise 12 guard tones at a left edge of the 320 MHz bandwidth of the channel and 11 guard tones at a right edge of the 320 MHz bandwidth of the channel.

6. The apparatus according to claim 4, wherein the 320 MHz bandwidth of the channel comprises 23 direct-current tones in a middle of the 320 MHz bandwidth of the channel.

7. A method applied in a wireless local area network (WLAN), the method comprising:
   determining, by a first apparatus, a short training sequence; and
   sending, by the first apparatus, the short training sequence on a channel, wherein a bandwidth of the channel is 320 MHz;
   wherein the short training sequence has a periodicity of 1.6 µs and satisfies the following:

$$S_{-2040:8:2040} = \{c1 \times (M,-1,M,-1,-M,-1,M), 0, C2 \times (-M, 1,M,1,-M,1,-M), a1, c3 \times (M,-1,M,-1,-M,-1,M), 0, c4 \times (-M,1,M,1,-M,1,-M), 0, c5 \times (M,-1,M,-1, -M,-1,M), 0, c6 \times (-M,1,M,1,-M,1,-M), a2, c7 \times (M,-1,M,-1,-M,-1,M), 0, c8 \times (-M,1,M,1,-M,1, -M)\} \times (1+j)/\sqrt{2};$$

wherein −2040:8:2040 refers to a tone subscript and is −2040, −2032, −2024, ..., −8, 0, 8, ..., 2024, 2032, 2040, and a value of other tones is 0; and
   wherein a value of $a_i$ is any one of $\{-1, 0, 1\}$, i=1, 2, a value of $c_j$ is any one of $\{-1, 1\}$, j=1, 2, 3, 4, 5, 6, 7, 8, and M={−1, −1, −1, 1, 1, 1, −1, 1, 1, 1, −1, 1, 1, −1, 1}.

8. The method according to claim 7, wherein a tone plan of the 320 MHz bandwidth of the channel uses four duplicated tone plans of 80 MHz, the 320 MHz bandwidth of the channel comprises 4096 total tones, and the 4096 total tones comprise 12 guard tones at a left edge of the 320 MHz bandwidth of the channel and 11 guard tones at a right edge of the 320 MHz bandwidth of the channel.

9. The method according to claim 7, wherein the 320 MHz bandwidth of the channel comprises 23 direct-current tones in a middle of the 320 MHz bandwidth of the channel.

10. A method applied in wireless local area network (WLAN), the method comprising:
   receiving, by a second apparatus, a part or all of a 320 MHz short training sequence on a channel, wherein a bandwidth of the channel is 320 MHz; and
   performing, by the second apparatus, automatic gain control (AGC) estimation based on the short training sequence;
   wherein the 320 MHz short training sequence has a periodicity of 1.6 µs and satisfies the following:

$$S_{-2040:8:2040} = \{c1 \times (M,-1,M,-1,-M,-1,M), 0, C2 \times (-M, 1,M,1,-M,1,-M), a_i, c3 \times (M,-1,M,-1,-M,-1,M), 0, c4 \times (-M,1,M,1,-M,1,-M), 0, c5 \times (M,-1,M,-1, -M,-1,M), 0, c6 \times (-M,1,M,1,-M,1,-M), a2, c7 \times (M,-1,M,-1,-M,-1,M), 0, c8 \times (-M,1,M,1,-M,1, -M)\} \times (1+j)/\sqrt{2};$$

wherein −2040:8:2040 refers to a tone subscript and is −2040, −2032, −2024, ..., −8, 0, 8, ..., 2024, 2032, 2040, and a value of other tones is 0; and
   wherein a value of $a_i$ is any one of $\{-1, 0, 1\}$, i=1, 2, a value of $c_j$ is any one of $\{-1, 1\}$, j=1, 2, 3, 4, 5, 6, 7, 8, and M={−1, −1, −1, 1, 1, 1, −1, 1, 1, 1, −1, 1, 1, −1, 1}.

11. The method according to claim 10, wherein a tone plan of the 320 MHz bandwidth of the channel uses four duplicated tone plans of 80 MHz, the 320 MHz bandwidth of the channel comprises 4096 total tones, and the 4096 total tones comprise 12 guard tones at a left edge of the 320 MHz bandwidth of the channel and 11 guard tones at a right edge of the 320 MHz bandwidth of the channel.

12. The method according to claim 10, wherein the 320 MHz bandwidth of the channel comprises 23 direct-current tones in a middle of the 320 MHz bandwidth of the channel.

13. A non-transitory computer-readable media storing computer instructions, that when executed by one or more processors, cause the one or more processors to:
   determine a short training sequence; and
   send the short training sequence on a channel, wherein a bandwidth of the channel is 320 MHz;
   wherein the short training sequence has a periodicity of 1.6 µs and satisfies the following:

$$S_{-2040:8:2040} = \{c1 \times (M,-1,M,-1,-M,-1,M), 0, C2 \times (-M, 1,M,1,-M,1,-M), a_i, c3 \times (M,-1,M,-1,-M,-1,M), 0, c4 \times (-M,1,M,1,-M,1,-M), 0, c5 \times (M,-1,M,-1, -M,-1,M), 0, c6 \times (-M,1,M,1,-M,1,-M), a2, c7 \times (M,-1,M,-1,-M,-1,M), 0, c8 \times (-M,1,M,1,-M,1, -M)\} \times (1+j)/\sqrt{2};$$

wherein −2040:8:2040 refers to a tone subscript and is −2040, −2032, −2024, ..., −8, 0, 8, ..., 2024, 2032, 2040, and a value of other tones is 0; and
   wherein a value of $a_i$ is any one of $\{-1, 0, 1\}$, i=1, 2, a value of $c_j$ is any one of $\{-1, 1\}$, j=1, 2, 3, 4, 5, 6, 7, 8, and M={−1, −1, −1, 1, 1, 1, −1, 1, 1, 1, −1, 1, 1, −1, 1}.

14. The non-transitory computer-readable media according to claim 13, wherein a tone plan of the 320 MHz bandwidth of the channel uses four duplicated tone plans of 80 MHz, the 320 MHz bandwidth of the channel comprises 4096 total tones, and the 4096 total tones comprise 12 guard tones at a left edge of the 320 MHz bandwidth of the channel and 11 guard tones at a right edge of the 320 MHz bandwidth of the channel.

15. The non-transitory computer-readable media according to claim 13, wherein the 320 MHz bandwidth of the channel comprises 23 direct-current tones in a middle of the 320 MHz bandwidth of the channel.

16. A non-transitory computer-readable media storing computer instructions, that when executed by one or more processors, cause the one or more processors to perform:
   receive a part or all of a 320 MHz short training sequence on a channel, wherein a bandwidth of the channel is 320 MHz; and
   perform automatic gain control (AGC) estimation based on the short training sequence;
   wherein the 320 MHz short training sequence has a periodicity of 1.6 µs and satisfies the following:

$$S_{-2040:8:2040} = \{c1 \times (M,-1,M,-1,-M,-1,M), 0, C2 \times (-M, 1,M,1,-M,1,-M), a_i, c3 \times (M,-1,M,-1,-M,-1,M), 0, c4 \times (-M,1,M,1,-M,1,-M), 0, c5 \times (M,-1,M,-1, -M,-1,M), 0, c6 \times (-M,1,M,1,-M,1,-M), a2, c7 \times (M,-1,M,-1,-M,-1,M), 0, c8 \times (-M,1,M,1,-M,1, -M)\} \times (1+j)/\sqrt{2}; \text{ and}$$

wherein −2040:8:2040 refers to a tone subscript and is −2040, −2032, −2024, . . . , −8, 0, 8, . . . , 2024, 2032, 2040, and a value of other tones is 0; and wherein a value of $a_i$ is any one of $\{-1, 0, 1\}$, i=1, 2, a value of $c_j$ is any one of $\{-1, 1\}$, j=1, 2, 3, 4, 5, 6, 7, 8, and M=$\{-1, -1, -1, 1, 1, 1, -1, 1, 1, 1, -1, 1, 1, -1, 1\}$.

17. The non-transitory computer-readable media according to claim 16, wherein a tone plan of the 320 MHz bandwidth of the channel uses four duplicated tone plans of 80 MHz, the 320 MHz bandwidth of the channel comprises 4096 total tones, and the 4096 total tones comprise 12 guard tones at a left edge of the 320 MHz bandwidth of the channel and 11 guard tones at a right edge of the 320 MHz bandwidth of the channel.

18. The non-transitory computer-readable media according to claim 16, wherein the 320 MHz bandwidth of the channel comprises 23 direct-current tones in a middle of the 320 MHz bandwidth of the channel.

* * * * *

UNITED STATES PATENT AND TRADEMARK OFFICE
CERTIFICATE OF CORRECTION

PATENT NO. : 11,902,065 B2
APPLICATION NO. : 18/173285
DATED : February 13, 2024
INVENTOR(S) : Zuo et al.

It is certified that error appears in the above-identified patent and that said Letters Patent is hereby corrected as shown below:

In the Specification

In Column 19, Line 31, delete "450" and insert -- 45° --.

In Column 19, Line 33, delete "2250" and insert -- 225° --.

In Column 39, Line 31, delete "a;" and insert -- $a_i$ --.

In Column 39, Line 31, delete "c," and insert -- $c_i$ --.

In the Claims

In Column 48, in Claim 1, Line 37, delete "C2" and insert -- c2 --.

In Column 49, in Claim 4, Line 3, delete "C2" and insert -- c2 --.

In Column 49, in Claim 4, Line 4, delete ",$a_i$," and insert -- ,a1, --.

In Column 50, in Claim 10, Line 1, delete "C2" and insert -- c2 --.

In Column 50, in Claim 10, Line 2, delete ",$a_i$," and insert -- ,a1, --.

In Column 50, in Claim 13, Line 30, delete "C2" and insert -- c2 --.

In Column 50, in Claim 13, Line 31, delete ",$a_i$," and insert -- ,a1, --.

In Column 50, in Claim 16, Line 63, delete "C2" and insert -- c2 --.

Signed and Sealed this
Seventh Day of May, 2024

Katherine Kelly Vidal
*Director of the United States Patent and Trademark Office*

In Column 50, in Claim 16, Line 64, delete ",$a_i$," and insert -- ,a1, --.

In Column 51, in Claim 16, Line 5, delete "c;" and insert -- $c_j$ --.